United States Patent
Kouchmeshky et al.

(10) Patent No.: US 11,520,076 B2
(45) Date of Patent: Dec. 6, 2022

(54) ESTIMATING PARAMETERS OF ARCHIE'S LAW AND FORMATION TEXTURE INFORMATION

(71) Applicant: BAKER HUGHES INCORPORATED, Houston, TX (US)

(72) Inventors: Babak Kouchmeshky, Kingwood, TX (US); Rashid W. Khokhar, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 908 days.

(21) Appl. No.: 15/081,434

(22) Filed: Mar. 25, 2016

(65) Prior Publication Data

US 2017/0276832 A1 Sep. 28, 2017

(51) Int. Cl.
*G01V 99/00* (2009.01)
*E21B 49/00* (2006.01)
*G01V 3/08* (2006.01)
*G01V 3/28* (2006.01)

(52) U.S. Cl.
CPC ............ *G01V 99/005* (2013.01); *E21B 49/00* (2013.01); *G01V 3/08* (2013.01); *G01V 3/28* (2013.01)

(58) Field of Classification Search
CPC .......... G01V 99/005; G01V 3/08; G01V 3/28; G01V 3/38; E21B 49/00; G06F 17/11
USPC .................................................. 703/2, 9, 10
See application file for complete search history.

(56) References Cited

U.S. PATENT DOCUMENTS

| | | | |
|---|---|---|---|
| 6,493,632 B1 * | 12/2002 | Mollison | G01V 3/28 702/2 |
| 7,263,443 B2 | 8/2007 | Clavaud | |
| 9,291,050 B2 | 3/2016 | Seleznev et al. | |
| 2007/0112518 A1 | 5/2007 | Montaron | |
| 2012/0065888 A1 | 3/2012 | Wu | |
| 2012/0229135 A1 | 9/2012 | Hurlimann et al. | |
| 2013/0200890 A1 | 8/2013 | Hursan | |
| 2014/0318232 A1 | 10/2014 | Pairoys | |

(Continued)

OTHER PUBLICATIONS

Sherman, Michael, "A Model for the Frequency Dependence of the Dielectric Permittivity of Reservoir Rocks," The Log Analyst, pp. 358-369 (Sep.-Oct. 1988).

(Continued)

*Primary Examiner* — Eunhee Kim
(74) *Attorney, Agent, or Firm* — Hogan Lovells US LLP

(57) ABSTRACT

Methods and apparatus for evaluating an earth formation for generating a numerical model comprising an expression equating a representation for the effective conductivity under Archie's law with respect to direct current with a function for the effective conductivity representative of the mixing model with respect to direct current; and solving a system of equations to obtain values for the Archie parameters including at least i) the expression; ii) a second expression equating a first order variation of the representation with a first order variation of the function with respect to water saturation of the formation (Sw); and iii) a third expression equating a first order variation of the representation with a first order variation of the function with respect to porosity of the formation ($\varphi$). The second and third expressions may equate derivatives of the representation with derivatives of the function.

16 Claims, 13 Drawing Sheets

(56) References Cited

U.S. PATENT DOCUMENTS

2018/0231681 A1\* 8/2018 Katterbauer ............. G01V 3/02

OTHER PUBLICATIONS

Giordano, Stefano, "Effective medium theory for dispersions of dielectric ellipsoids," Jnl of Electrostatics 58, pp. 59-76 (2003).
PCT Application No. PCT/US2017/023522—International Preliminary Report on Patentability dated Sep. 25, 2018.

\* cited by examiner

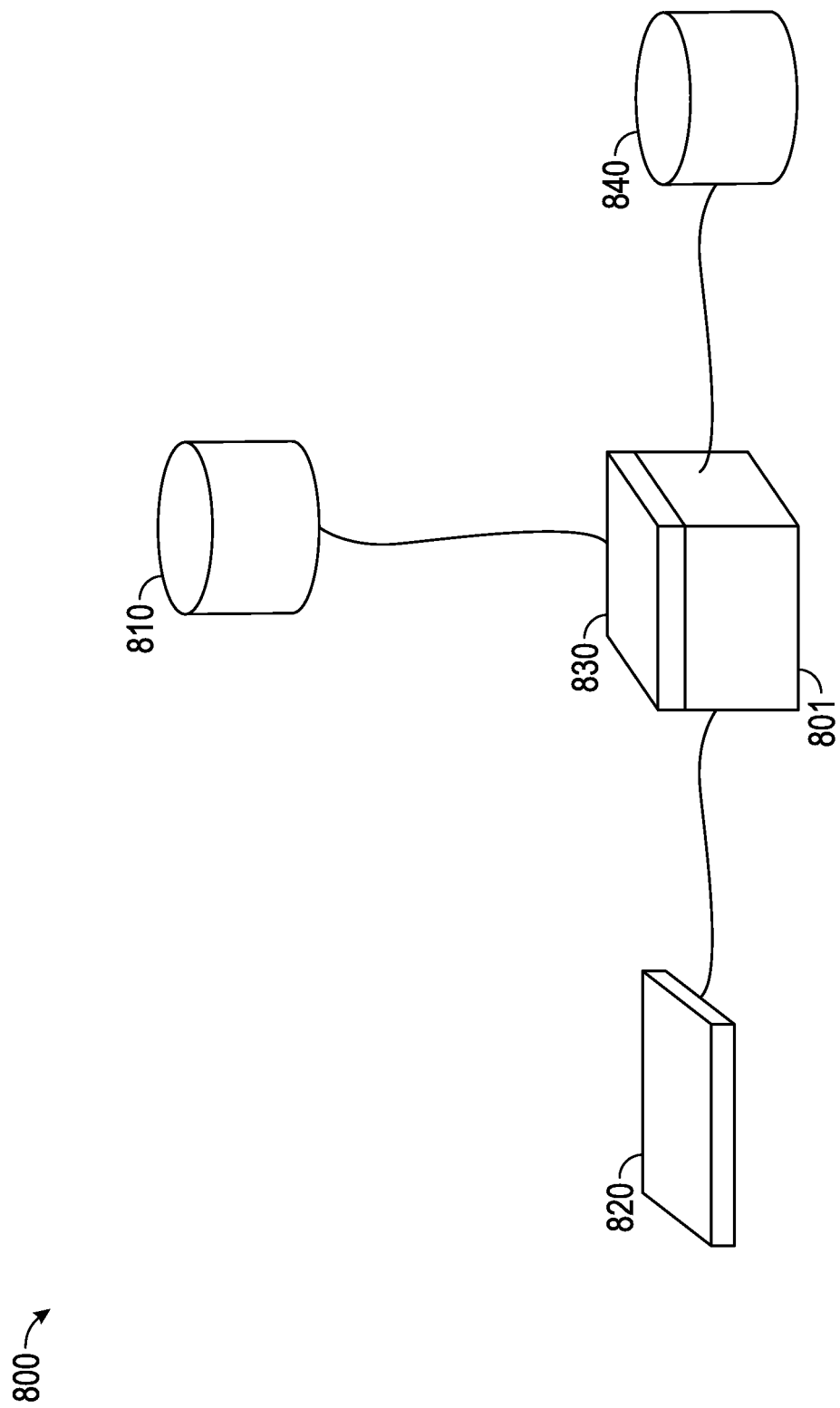

ESTIMATING PARAMETERS OF ARCHIE'S LAW AND FORMATION TEXTURE INFORMATION

FIELD OF THE DISCLOSURE

This disclosure generally relates to exploration and production of hydrocarbons involving investigations of regions of an earth formation penetrated by a borehole. More specifically, the disclosure relates to interpretation of dielectric measurements of an earth formation using a logging tool in a borehole.

BACKGROUND OF THE DISCLOSURE

Electrical earth borehole logging is well known and various devices and various techniques have been described for this purpose. Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The measured responses are affected by properties of the earth formation including electrical conductivity, magnetic permeability, dielectric permittivity and the pore volume or porosity of the rock matrix and water saturation.

The dielectric constant of the formation may be estimated by transmitting an electromagnetic (EM) wave into the formation, and receiving it at one or more receivers (e.g., at receiver antennas). Then, the attenuation and phase shift between the received signals and the transmitted signals are determined, which are used to estimate the dielectric constant of the formation. Alternatively, the attenuation and phase shift between spaced receivers may be used to estimate the dielectric constant of the formation.

By combining complex permittivity measurements with measurements from other borehole devices (e.g., total effective formation porosity), the oil saturation of the formation and resistivity of water can be estimated.

SUMMARY OF THE DISCLOSURE

In aspects, the present disclosure is related to a method for evaluating an earth formation having an effective conductivity characterized by Archie's law. The evaluation is carried out using complex dielectric measurements. The complex dielectric measurements are modeled using a mixing model approximating the dielectric behavior of the formation.

Method embodiments include generating a numerical model comprising an expression equating a representation for the effective conductivity under Archie's law with respect to direct current with a function for the effective conductivity representative of the mixing model with respect to direct current; and solving a system of equations to obtain values for the Archie parameters. The representation may include an Archie equation comprising a plurality of unknown Archie parameters. The system of equations may include at least i) the expression; ii) a second expression equating a first order variation of the representation with a first order variation of the function with respect to water saturation of the formation (Sw); and iii) a third expression equating a first order variation of the representation with a first order variation of the function with respect to porosity of the formation ($\varphi$).

The second expression may equate a derivative of the representation with a derivative of the function with respect to water saturation of the formation (Sw), and the third expression may equate a derivative of the representation with a derivative of the function with respect to porosity of the matrix of the formation ($\varphi$). Solving the system of equations to obtain values for the Archie parameters may be carried out using an estimated value for the porosity of the matrix of the formation ($\varphi$). This estimated porosity value may be obtained using measurements from separate tools taken previously.

Solving the system of equations to obtain values for the Archie parameters may include fitting the mixing model to dielectric measurements at a plurality of frequencies to estimate values for salinity of the water of the formation, water saturation of the formation (Sw), and permittivity of the rock matrix of the formation; and using the estimated values for salinity of the water of the formation, water saturation of the formation (Sw), to solve the system of equations. Methods may include using the values for the Archie parameters to model at least one of i) the conductivity of a volume of interest of the formation at DC, and ii) the resistivity a volume of interest of the formation at DC. Generating the numerical model using the mixing model may be independent of a choice of particular mixing model. The complex dielectric measurements may be taken at substantially the same radial depth of investigation. Generating the numerical model may be performed without any assumed values for any of the Archie parameters. Methods may avoid extrapolation of a measured resistivity of the formation. Methods may include using the values for the Archie parameters to estimate a parameter of interest of the formation. Methods may include conducting further operations in the formation in dependence upon the estimated parameter of interest. Methods may include performing at least one of the following: i) displaying the values for the Archie parameters; ii) recording the values for the Archie parameters; and iii) transmitting the values for the Archie parameters. The complex dielectric measurements may be taken at a plurality of radial depths of investigation. Water saturation may be substantially the same at each radial depth of investigation of the plurality.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 8 shows an information processing system 800 implementing a hardware environment in accordance with embodiments of the present disclosure.

DETAILED DESCRIPTION

Figure 1:
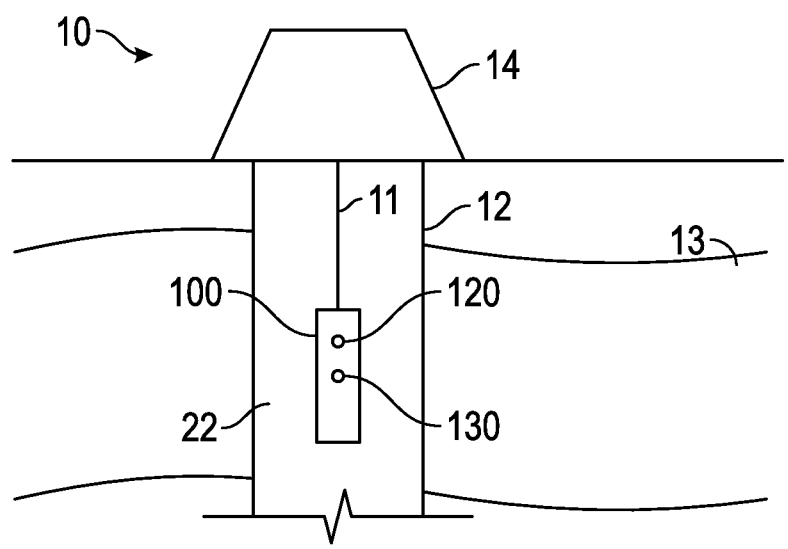
FIG. 1 shows an exemplary embodiment of a system for evaluation of an earth formation using measurements from a downhole electromagnetic tool.

This disclosure generally relates to exploration for hydrocarbons involving electromagnetic investigations of a borehole penetrating an earth formation. These investigations may include estimating at least one parameter of interest of the earth formation.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Dielectric permittivity arises in sedimentary rock from the ability of electric dipoles to align themselves with an alternating electromagnetic field, such as one induced by a downhole tool. Several phenomena contribute to $\varepsilon_r$ in a porous earth formation. One contribution is the rotation of dipolar molecules (e.g., water). In the presence of an applied electric field, a dipolar molecule will rotate to align the positive and negative poles of the molecule with the applied electric field. In an alternating field such, the molecule will rotate constantly with the variation in polarity of the applied field. While the molecule is in rotation to align with the applied field, the movement of the charge represents electrical charges moving in phase with the applied field and are therefore carrying current and contributing to the composite formation conductivity. Once aligned with the field, the polarized molecules represent fixed or stored charges and thereby contribute to the formation permittivity until the polarity of the alternating applied field is reversed. At this time, the molecules again rotate contributing again to composite formation conductivity. The motions of ions also contribute, compounding these effects.

Measured values of $\varepsilon_r$ are dependent upon the frequency of the applied field. At low frequencies, dielectric constants can be quite high since the water molecules can easily rotate and align themselves with the field before the polarity of the field reverses. Similarly, dissolved ions can migrate to the boundary of the pore space and accumulate against the pore wall long before the polarity of the field reverses. Therefore, at low frequencies, molecules spend most of the AC cycle in a fixed orientation or position and only a small fraction of the time moving.

At high frequencies, the polarity of the applied field will reverse before mobile charges come to rest. In this situation, the mobile charges spend most of their time moving in phase with the external electromagnetic field, thereby increasing the conductivity and resulting in a lower measured dielectric constant. The phenomena of changing dielectric and conductivity values with frequency is known as dispersion. The frequency at which the rotating molecules or mobile ions can no longer keep pace with the oscillating field is known as the "relaxation frequency". The relaxation frequency, relative dielectric constant Er, and conductivity a will depend upon various factors such as porosity, mean pore size, water saturation, formation texture, the resistivity of the water $R_w$, and shale mineralogy. See M. A. Sherman, "A Model for the Frequency Dependence of the Dielectric Permittivity of Rock", The Log Analyst, Vol. 29, No. 5, September-October, 1988.

Geophysical media within an earth formation may be mixtures of materials, with each material exhibiting different dielectric characteristics. In remote-sensing applications, it may be desirable to approximate the microscopically complicated mixture as macroscopically homogeneous volume and characterize it by an effective permittivity. One constituent in these mixtures is typically water. The dielectric properties of the volume are sensitive to small variations in the fractional component volumes, because the permittivity of water is usually very different than that of the other components (e.g., hydrocarbons and dry rock).

Dielectric logging uses the contrast between dielectric constant of water, rock and oil to estimate the formation water content. The permittivity of the formation can be considered as a complex quantity which contains dielectric constant and conductivity in its real and imaginary component $$\tilde{\varepsilon}_r(\omega) = \varepsilon_r(\omega) + i\frac{\sigma(\omega)}{\omega\varepsilon_0} \quad (1)$$

where $\tilde{\varepsilon}_r$ is the complex value representing relative permittivity, $\varepsilon_r$ is relative dielectric constant, $\sigma$ is electrical conductivity, $\omega$ is angular frequency and $\varepsilon_0$ is dielectric constant of vacuum. In current dielectric logging tools, the magnitude and phase of an electromagnetic wave propagating in the formation is measured at multiple receivers. The relative magnitude and phase of a detected signal at the respective receivers is used to obtain $\varepsilon_r$ and $\sigma$, which are functions of frequency due to the dispersive behavior of the formation. In practice, the measurement is performed at multiple frequencies in order to obtain a good estimate of the dispersive behavior.

The dispersive behavior of the formation is a result of the properties of its constituents (water, rock matrix and hydrocarbon) as well as the volume fraction of each of these phases, their geometry and distribution within a representative volume of the formation. However, the mixture of these three phases exhibits a dispersive behavior different from the weighted average of dispersive behavior of each. There exist several mixing laws (or mixing models) that relate the dielectric behavior of a mixture to the properties of its constituents. Several dielectric models have been set forth which attempt to approximate the permittivity of mixtures in terms of the known dielectric constants and volume fractions of the constituents. Some example mixing models include the Complex Refractive Index Model (CRIM) and Looyenga-Landau-Lifshitz model, along with other exponential models, and variants of the Maxwell-Garnett model, including the Coherent Potential model, and the Symmetric Bruggeman Model.

The parameters of the volume of interest of the formation affecting dielectric behavior of the formation include water saturation, water conductivity, permittivity of dry rock, permittivity of hydrocarbons, textural parameters of the formation (e.g., grain shape), and total porosity. As dielectric dispersive behavior of the volume is sensitive to these parameters, measuring the dielectric behavior of the formation at multiple frequencies provides a means to quantify these parameters.

Measuring the dielectric dispersive behavior of the formation and fitting it to mixing laws that are shown to be representative of the behavior of the formation under study provides information on the volume fraction of each component and formation texture information. This information is invaluable for estimating the hydrocarbon content in the reservoir under study.

Other models may be employed to correlate electrical properties of volumes of interest of an earth formation with other formation properties. One of the most widely used models is the Archie relation, or Archie's law, formulated by Gus Archie. Archie's law is an empirical law that is widely used to calculate the electrical conductivity of the formation based on porosity of rock, water saturation and conductivity. Archie's law (expressed in one format) is as follows:

$$\sigma_{eff} = \frac{1}{a} \phi^m S_w^n \sigma_w \quad (2)$$

where $\sigma_{eff}$ is conductivity of a formation at DC, $\varphi$ is porosity of the rock matrix of the formation, $S_W$ is water saturation of the formation, $\sigma_W$ is water conductivity of the formation at DC, a is tortuosity factor, m is cementation exponent, and n is saturation exponent. The parameters a, m, and n are referred to as Archie parameters. The cementation exponent is related to connectivity of the pore structure of the rock and it decreases as the fluid permeability of rock increases. The saturation exponent is related to wettability of rock. In the case of water wet rocks, even for low water saturation levels, a continuous electrical path can form due to presence of a thin layer of water around the grains. The tortuosity depends on grain size and pore structure.

One reason for the popularity of Archie's law is that, because it uses measurements of effective conductivity, it performs well with legacy tools, tools with a high logging speed, and tools with large depths of investigation. So it provides a fast and cost effective means of exploration. In effect, Archie's law relates the conductivity of the formation to the conductivity of water (the only formation component having a conductivity that is not substantially zero) through a formulation that implicitly includes textural information via cementation and saturation exponents.

One issue with using Archie's law is determining the parameters for a given volume or formation. Often the parameters are determined by analogy to other formations. Traditionally, Archie's law has been used by petro-physicists in clean sands for relating the electrical conductivity of the formation to its water saturation. Analogizing to a formation having a different lithology has proven difficult. Another conventional method reduces the number of unknowns in Equation 2 by assuming a=1 and m=n and uses extrapolated value of resistivity at DC to solve for Archie's parameters. Problematically, however, this requires assuming values or other constraints for the Archie parameters initially which can lead to significant error in estimation of the parameters. A third conventional method tries to add to the number of equations by measuring conductivity of the formation at different radial depths and extrapolating the measurements to a measurement at a direct current, while assuming that all the parameters are identical at the different radial depths. The accuracy of this method is also in question due to need for extrapolating measured results to DC and the fact that, for the shallow depth of investigation of these tools, the different radial readings may not exhibit significant variations. Hence, no extra information (e.g., extra equation) will be available to be able to solve for more than one unknown parameters in Archie's equation. Accuracy and precision of the estimated parameters are necessarily significantly compromised in each of these traditional techniques.

Techniques of the Present Disclosure

Aspects of the present disclosure relate to the employment of the information contained in dielectric dispersion measurements to find parameters of Archie's law. General aspects include method embodiments for evaluating an earth formation having an effective conductivity characterized by Archie's law using complex dielectric measurements, wherein the complex dielectric measurements are modeled using a mixing model approximating the dielectric behavior of the formation.

Methods include generating a numerical model comprising an expression equating a representation for the effective conductivity under Archie's law with respect to direct current with a function for the effective conductivity representative of the mixing model with respect to direct current and solving a system of equations to obtain values for the Archie parameters. The representation comprises an Archie equation including a plurality of unknown Archie parameters. The system of equations includes at least: i) the expression; ii) a second expression equating a first order variation of the representation with a first order variation of the function with respect to water saturation of the formation (Sw); and iii) a third expression equating a first order variation of the representation with a first order variation of the function with respect to porosity of the formation ($\varphi$).

The second expression may equate a derivative of the representation with a derivative of the function with respect to water saturation of the formation (Sw), and the third expression may equate a derivative of the representation with a derivative of the function with respect to porosity of the matrix of the formation (φ). Solving the system of equations to obtain values for the Archie parameters may be carried out by using an estimated value for the porosity of the matrix of the formation (φ). Solving the system of equations to obtain values for the Archie parameters may be carried out by fitting the mixing model to dielectric measurements at a plurality of frequencies to estimate values for salinity of the water of the formation, water saturation of the formation (Sw), and permittivity of the rock matrix of the formation; and using the estimated values to solve the system of equations. Methods may include using the values for the Archie parameters to model at least one of i) the conductivity of a volume of interest of the formation, and ii) the resistivity a volume of interest of the formation.

Using these techniques, generating the numerical model using the mixing model is independent of a choice of particular mixing model. Further, the complex dielectric measurements are taken at substantially the same radial depth of investigation. Also, generating the numerical model may be performed without any assumed values for any of the Archie parameters. Beneficially, the techniques herein avoid the error associated with extrapolating the measured resistivity of the formation to its value at direct current.

Typically, the dielectric constants of the materials are complex numbers, which results in a complex effective permittivity for the mixture. This is reflective of the dependence of the response of the materials to the frequency of the electric field. Since the response of materials to alternating fields is characterized by a complex permittivity, it is natural to separate its real and imaginary parts, which is done by convention in the following way:

$$\varepsilon(\omega) = \varepsilon'(\omega) - i\varepsilon''(\omega) \qquad (3)$$

wherein ε' is the real part of the permittivity, which is related to the stored energy within the medium and ε" is the imaginary part of the permittivity, which is related to the dissipation (or loss) of energy within the medium.

The complex permittivity of the earth formation may be estimated using a well logging system. Electromagnetic waves are energized in the formation using a transmitter antenna disposed in the borehole. The attenuation and phase difference between signals received by spaced receiver antennas disposed in the borehole may be used to estimate the complex permittivity, which may be used to estimate a water saturation and other parameters of interest of the formation.

FIG. 1 shows an exemplary embodiment of a system for evaluation of an earth formation using measurements from a downhole electromagnetic tool. The system 10 includes a carrier 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications.

As described herein, "formations" refer to the various features and materials that may be encountered in a subsurface environment and surround the borehole. The term "information" includes, but is not limited to, raw data, processed data, and signals.

It should be understood that embodiments of the present disclosure are equally well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

In one embodiment, the system 10 includes a conventional derrick 14 that may supports a rotary table that is rotated at a desired rotational speed. The carrier 11 may include one or more drill pipe sections that extend downward into the borehole 12 from the rotary table, and is connected to a drilling assembly. Drilling fluid or drilling mud 22 is pumped through the drillstring 11 and/or the borehole 12. The well drilling system 10 may also include a bottomhole assembly (BHA). In one embodiment, a drill motor or mud motor is coupled to the drilling assembly and rotates the drilling assembly when the drilling fluid 22 is passed through the mud motor under pressure.

The system 10 includes any number of downhole tools 100 for various processes including formation drilling, geosteering, and formation evaluation (FE) for measuring versus depth and/or time one or more physical quantities in or around a borehole. The tool 100 may be included in or embodied as a BHA, drillstring component or other suitable carrier. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

In one embodiment, one or more downhole components, such as the drillstring 11 or the downhole tool 100, may include sensor devices 120 configured to measure various parameters of the formation and/or borehole. For example, one or more parameter sensors 120 (or sensor assemblies such as MWD subs) are configured for formation evaluation measurements and/or other parameters of interest (referred to herein as "evaluation parameters") relating to the formation, borehole, geophysical characteristics, borehole fluids and boundary conditions. These sensors 120 may include formation evaluation sensors (e.g., resistivity, dielectric constant, water saturation, porosity, density, permeability, anisotropy, or shale volume), sensors for measuring borehole parameters (e.g., borehole size, borehole inclination and azimuth, and borehole roughness), sensors for measuring geophysical parameters (e.g., acoustic velocity, acoustic travel time, electrical resistivity), sensors for measuring borehole fluid parameters (e.g., viscosity, density, clarity, rheology, pH level, and gas, oil and water contents), boundary condition sensors, and sensors for measuring physical and chemical properties of the borehole fluid. The system 10 may also include sensors 130 for measuring force, operational and/or environmental parameters related to bending or other static and/or dynamic deformation of one or more downhole components.

Downhole tool 100 may be coupled or combined with additional tools including some or all the hardware environment 800, as shown in FIG. 8 below. The hardware environment may implement one or more control units configured to operate the tool 100 or other components of system 10, and/or conduct method embodiments disclosed below.

A point of novelty of the system illustrated in FIG. 1 is that the control unit(s) is configured to perform certain methods (discussed below) that are not in the prior art. A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging. In some embodiments, the electromagnetic tool 10 may include at least one transmitting antenna and at least one receiving loop antenna mounted on a pad.

The tool may be operated in at least two modes. A first mode may be referred to as Mini-MPR (Multiple Propagation Resistivity) mode that may measure attenuation and a phase difference between the two receivers. The electromagnetic tool 10 may also be operated in a second mode (an induction mode) in which a compensated magnetic field (voltage) may be measured. The current in the transmitter coil may induce a magnetic field in the earth formation 13. This magnetic field, in turn, may cause eddy currents to flow in the earth formation 13. Because of the presence of these formation currents, a magnetic field may be coupled into a receiver coil R thereby generating a receiver signal. Logging tools having "a receiver coil" and "a transmitter coil" each comprised of several coils arranged in a predetermined fashion to obtain a desired response may be used. The receiver signal may then be amplified and applied to one or more phase sensitive detectors (PSDs). Each PSD may detect a phase component signal having a phase identical to a phase reference signal which may also be applied to the detector. The phase reference signal may have a predetermined phase relationship to the current in the transmitter coil(s). The output of the PSD(s) may be further processed downhole, or may be sent uphole to surface equipment for processing or display to an operating engineer.

In Mini-MPR mode, which may employ two symmetric transmitter antennas, attenuation and phase may be measured at each of the transmitter. The measurements may be averaged to give the final readings:

$$Att = \frac{Att_{T1} + Att_{T2}}{2}; \quad (4)$$

$$Pha = \frac{Pha_{T1} + Pha_{T2}}{2}$$

where the subscripts T1 and T2 denote the first and second receivers. Assuming a uniform earth formation for which the magnetic fields at the receiver locations are H1 and H2 and assuming that the two receivers have gains $G_1$ and $G_2$, the ratio of the two receiver outputs for the 1st transmitter may be derived from the ratio:

$$R_{T1} = \frac{G_2 H_2}{G_1 H_1} = \frac{G_2}{G_1} \frac{A_2}{A_1} e^{i\Delta\phi} \quad (5)$$

where $A_1$ and $A_2$ are the amplitudes of $H_1$ and $H_2$, respectively; $\Delta\phi$ is the phase difference between the two receivers. From eqn. (5) it follows $$Att_{T1} = -20\log\frac{G_2}{G_1} - 20\log\frac{A_2}{A_1}, \quad (6)$$

$$Pha_{T1} = \Delta\phi. \quad (7)$$

Thus, it is clear that the gain change affects attenuation measurement but not the phase difference measurement. Similarly, attenuation measurement for the 2nd transmitter is derived from $$R_{T1} = \frac{G_1 H_2}{G_2 H_1} = \frac{G_1}{G_2} \frac{A_2}{A_1} e^{i\Delta\phi}. \quad (8)$$

The attenuation measurement may be written as:

$$Att_{T1} = -20\log\frac{G_1}{G_2} - 20\log\frac{A_2}{A_1}. \quad (9)$$

Averaging equations (5) and (6) may remove the effect of gain variation. Those versed in the art would recognize that measurements of amplitude and phase can, in addition to resistivity determination, also be used for determining the dielectric constant of the earth formation.

In the induction mode, one receiver loop coil may serve as a main receiver and the other as a bucking receiver. The transmitting antennas may include loops and/or electric dipoles. For loop transmitter antennas, the transmitters and receivers may be in one of three orientations. If the z-axis of the tool is parallel to the longitudinal axis of the tool, then the x-axis may be radial through the center of the pad, and the y-axis may be tangential to the pad. The zz-component may refer to a z-source and a z-receiver and so on. In some embodiments, xx-transmitters and receivers may be used.

As described above, dielectric measurement and evaluation may include the estimation of electric permittivity of materials. Electric permittivity may include imaginary and real parts, which may vary with the frequency of an electrical signal exposed to a material. In some aspects, electric permittivity may be estimated using an electromagnetic tool configured to generate an electric current at a plurality of frequencies.

Figure 2A:
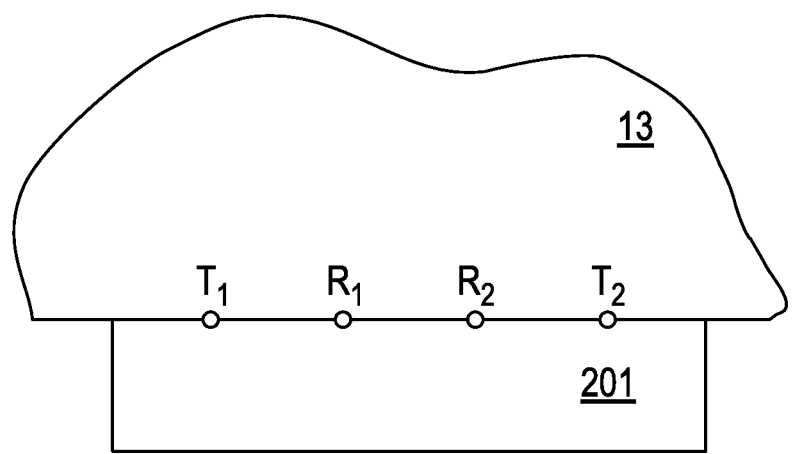
FIG. 2A depicts a cross-sectional view of downhole tool in a homogenous medium.

FIG. 2A depicts a cross-sectional view of downhole tool 201 (e.g., electromagnetic tool, dielectric tool, or other logging tool, etc.) in a homogenous medium. The tool 201 may include transmitters T1, T2 and receivers R1, R2. The transmitters T1, T2 may be symmetrically arranged with the receivers R1, R2. That is, the distance from T1 to R1 may be equal to the distance from T2 to R2; and the distance from T1 to R2 may be equal to the distance from T2 to R1.

A conventional technique of measurement compensation involving two receivers positioned symmetrically with respect to two transmitters (as shown in FIG. 2A) is demonstrated. The relative phase shift between R1 and R2 when T1 is fired may be given by:

$$\theta_{R_1R_2}^{T_1} = \theta_{R_2}^{T_1} - \theta_{R_1}^{T_1} \tag{10}$$

The relative phase shift between R1 and R2 when T2 is fired may be given by:

$$\theta_{R_1R_2}^{T_2} = \theta_{R_1}^{T_2} - \theta_{R_2}^{T_2} \tag{11}$$

The compensated relative phase may be given by:

$$\theta_{R_1R_2} = 0.5(\theta_{R_1R_2}^{T_1} + \theta_{R_1R_2}^{T_2}) \tag{12}$$

where $\theta_{R_j}^{T_i}$ is the phase measured by receiver j when transmitter i is fired and can be written as $$\theta_{R_j}^{T_i} = \theta_{T_i} + \theta_{R_j} + \theta(r) \tag{13}$$

in which $\theta_{T_i}$ and $\theta_{R_j}$ are the phase shifts of transmitter i and receiver j with respect to a common source and $\theta(r)$ is the phase shift due to wave traveling in the probed medium between transmitter and receiver which are apart by a distance of r.

Equations (10) and (11) eliminate the effect of internal phase shift at T1 and T2. As it can be seen from plugging in Equation 13 in Equations 10 and 11 and using Equation 12 one can eliminate the effect of phase shift at R1 and R2. The assumption behind this method is that the wave traveling from either of the transmitters would experience the same phase shift in the probed medium which means that the medium in front of the transmitter and receiver should be homogenous or symmetrically positioned (with respect to transmitters and receivers) heterogeneous.

Figure 2B:
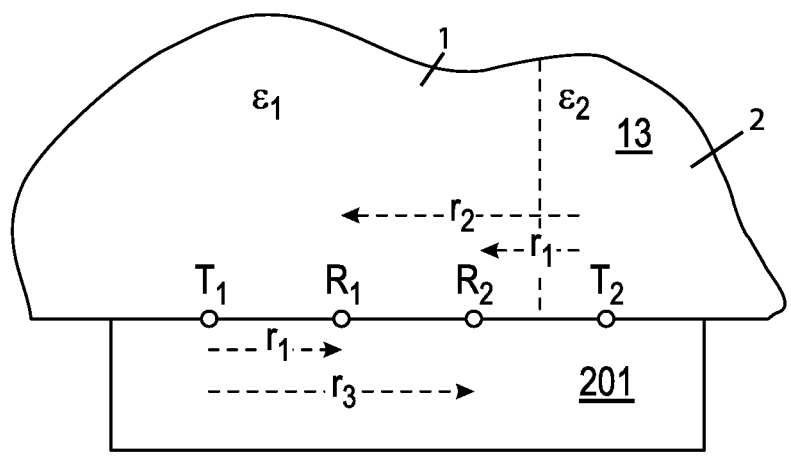
FIG. 2B depicts a cross-sectional view of tool in heterogenous media having relative permittivities, $\varepsilon_1$ and $\varepsilon_2$.

FIG. 2B depicts a cross-sectional view of tool 201 in heterogenous media having relative permittivities, $\varepsilon_1$ and $\varepsilon_2$. Generally, for an electromagnetic wave propagating in a near field regime, the phase difference between the wave passing through points in space is not only a function of the distance between the two points ($r_2-r_1$) but also a function of absolute position of those points ($r_1$ and $r_2$). Consider the medium of FIG. 2B, where the tool is positioned in a way that the interface between medium 1 and medium 2 is located between Transmitter 2 and the closest receiver (Receiver 2). Ignoring the effect of reflection at the interface, the effect of medium 2 can be replaced by an equivalent medium with the same properties as of medium 1, but with longer distance between Transmitter 2 and receivers (since $\varepsilon_2 > \varepsilon_1$).

Figure 2C:
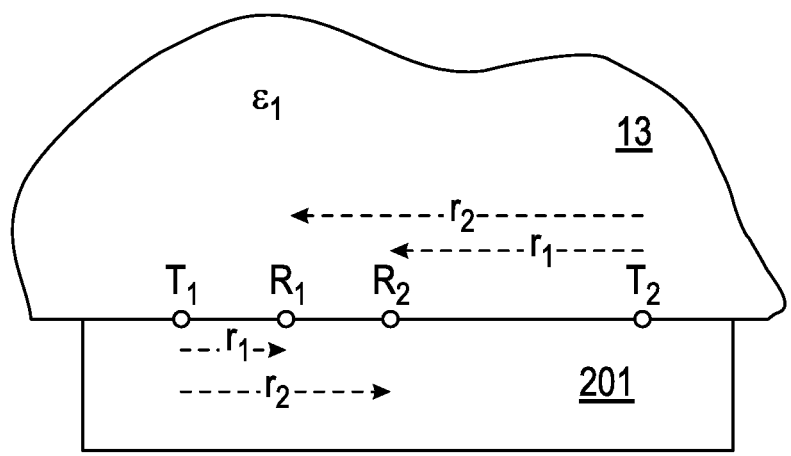
FIG. 2C shows the approximate effect of heterogeneous media on the propagation of an electromagnetic wave.

FIG. 2C shows the approximate effect of heterogeneous media on the propagation of an electromagnetic wave. Referring to FIGS. 2B-2C, although $r_2-r_1=r_2^*-r_1^*$, $r_2 \neq r_2^*$ and $r_1 \neq r_1^*$; thus, the "simulated" distances between transmitter and receivers from the left and right are not equal. This leads to an unequal phase shift for an electromagnetic wave travelling from these transmitters, which renders the traditional approach invalid.

Figure 2D:
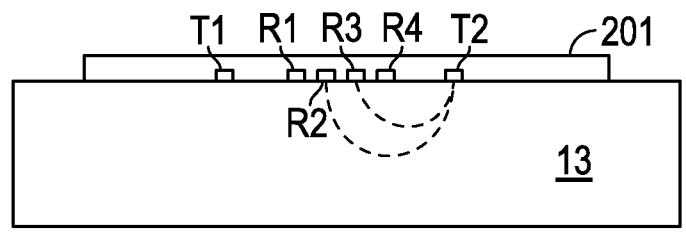
FIG. 2D shows the phase shifts of wave propagation tool 207 according to embodiments of the present disclosure.

FIG. 2D shows the phase shifts of wave propagation tool 201 according to embodiments of the present disclosure. Tool 201 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3.

Referring to FIG. 2D, to obtain the phase difference between receivers R2 and R3, the symmetrical transmitters are used to cancel the effect of phase shift on each receiver. Upon firing transmitter T1, the phase shifts at R2 and R3 may be expressed as:

$$\theta_{R_3}^{T_1} = \theta_{T_1R_3} - \theta_{R_3}^{sh} \tag{14}$$

$$\theta_{R_2}^{T_1} = \theta_{T_1R_2} - \theta_{R_2}^{sh} \tag{15}$$

where $\theta_{R_j}^{T_i}$ is the phase shift recorded at receiver j when transmitter i is fired, $\theta_{T_iR_j}$ is representative of the time the EM wave propagates in the formation, $\theta_{R_j}^{sh}$ is the internal value of the phase shift at receiver j. The relative phase shift between receivers R2 and R3 after firing transmitter T1 (i.e., $\theta_{R_2}^{T_1} - \theta_{R_3}^{T_1}$) may be expressed as:

$$\theta_{R_2R_3}^{T_1} = \theta_{T_1R_2} + \theta_{R_2}^{sh} - \theta_{T_1R_3} - \theta_{R_3}^{sh} \tag{16}$$

Upon firing transmitter T2, the phase shifts at R2 and R3 may be expressed as:

$$\theta_{R_3}^{T_2} = \theta_{T_2R_3} - \theta_{R_3}^{sh} \tag{17}$$

$$\theta_{R_2}^{T_2} = \theta_{T_2R_2} - \theta_{R_2}^{sh} \tag{18}$$

The relative phase shift between receivers R3 and R2 after firing transmitter T2 may be expressed as ($\theta_{R_3}^{T_2} - \theta_{R_2}^{T_2}$):

$$\theta_{R_3R_2}^{T_2} = \theta_{T_2R_3} + \theta_{R_3}^{sh} - \theta_{T_2R_2} - \theta_{R_2}^{sh} \tag{19}$$

Conventionally, it may be assumed that these phase shifts are equal:

$$\theta_{T_2R_2} = \theta_{T_1R_3}, \theta_{T_2R_3} = \theta_{T_1R_2} \tag{20}$$

After substituting $\theta_{T_1R_2}$ and $\theta_{T_1R_3}$ into Eq. (19), the relative phase shift between receivers R3 and R2 after firing transmitter T2 (i.e., $\theta_{R_3}^{T_2} - \theta_{R_2}^{T_2}$) may be given by:

$$\theta_{R_3R_2}^{T_2} = \theta_{T_1R_2} + \theta_{R_3}^{sh} - \theta_{T_1R_3} - \theta_{R_2}^{sh} \tag{21}$$

Thus, a compensated measurement for the relative phase between receivers R3 and R2 may be given as:

$$\theta_{R_2R_3}^{com} = \frac{(\theta_{R_2R_3}^{T_1} + \theta_{R_3R_2}^{T_2})}{2} \tag{22}$$

$$\theta_{R_2R_3}^{com} = \theta_{T_1R_2} - \theta_{T_1R_3} \tag{23}$$

Techniques in accordance with embodiment of the present disclosure as described herein may be employed in connection with a variety of downhole tools conveyed on various carriers. Several general examples are described hereinbelow.

Figure 3A:
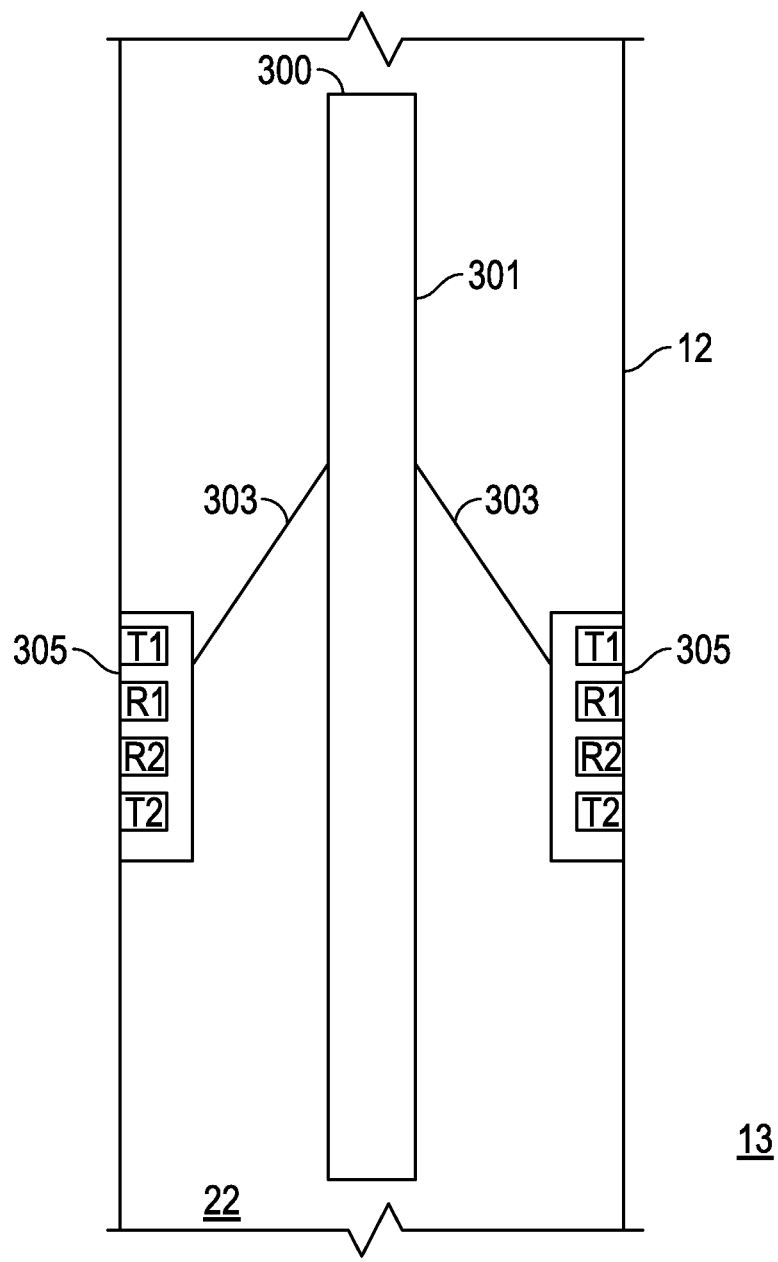
FIG. 3A shows downhole logging tool for evaluating an earth formation according to embodiments of the present disclosure.

FIG. 3A shows downhole logging tool (downhole tool, logging tool, multi-frequency dielectric array logging tool, electromagnetic tool, dielectric tool, or tool) 300 for evaluating an earth formation according to embodiments of the present disclosure. The dielectric tool 300 may be disposed on carrier 11 (not shown) intersecting the earth formation 13. The dielectric tool 300 may include a body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 12 and make measurements indicative of at least one parameter of interest of the earth formation, such as (i) a water saturation of the formation, (ii) a water conductivity of the formation, (iii) a relative complex permittivity of the formation, (iv) a permittivity of rock matrix, (v) a complex permittivity of mudcake, (vi) a thickness of the mudcake, (vii) a texture of the rock, (viii) cementation exponent, (ix) saturation exponent, (x) cation exchange capacity, and (xi) a relative phase shift, (xii) a relative amplitude.

Pads 305 may include a face configured to engage the borehole 12. The term "engage," as used herein, may be defined as in contact with the borehole 12, urged against the borehole 12, pressed firmly against the borehole 12, or positioned proximate the borehole 12. The term "proximate," as used herein, may be defined as the pad being near the borehole 12 such that measurements may be taken from the pad that are useful in evaluating the borehole, earth formation, or both. The term "face" refers to the surface, edge, or side of the tool body or pad that is closest to the borehole wall.

Pads 305 may include transmitter T1, T2 and receivers R1, R2. The transmitters may be configured to radiate EM waves into the formation; and the receivers may be configured to be responsive to the EM waves radiating in the formation and generate a signal that is indicative of the parameter of interest (e.g., phase shift, amplitude, water saturation, water conductivity, or permittivity of the formation, salinity). A processor may be configured to estimate the amplitude attenuation and phase difference between the transmitted signal and the received signals, which are used to estimate the parameter of interest. As an example, the attenuation and phase difference may be estimated between the received signals from at least two spaced receivers. This processing may be done downhole or at the surface, by using one or more processors (e.g., information processing system 800 of FIG. 8).

Figure 3B:
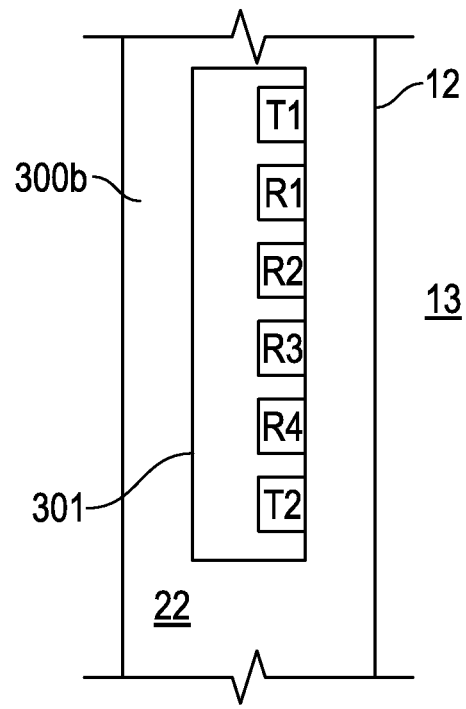
FIG. 3B shows a cross-sectional view of multi-frequency dielectric logging tool 300b in accordance with embodiments of the present disclosure.

FIG. 3B shows a cross-sectional view of multi-frequency dielectric logging tool 300b in accordance with embodiments of the present disclosure. Dielectric tool 300b may include tool body 301 having transmitters T1, T2 and receivers R1-R4 disposed on tool body 301. In other embodiments, the transmitter-receiver configuration of logging tool 300b may be included on pads 305.

Figure 3C:
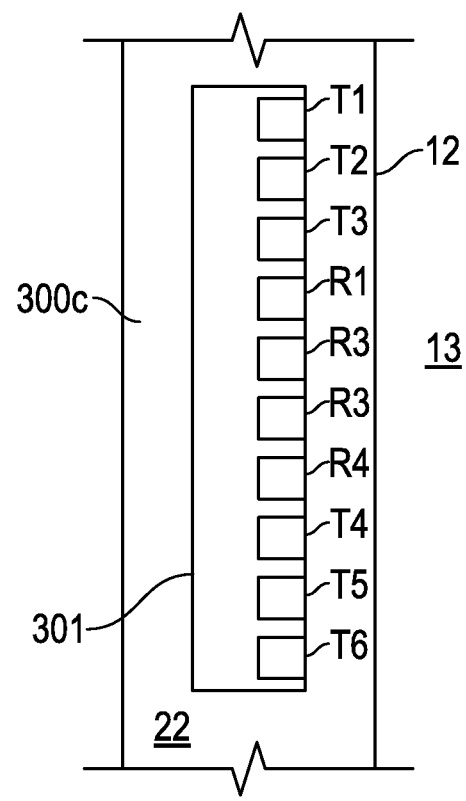
FIG. 3C shows a cross-sectional view of multi-frequency dielectric logging tool in accordance with embodiments of the present disclosure.

FIG. 3C shows a cross-sectional view of multi-frequency dielectric logging tool in accordance with embodiments of the present disclosure. Dielectric tool 300c may include tool body 301 having transmitters T1-T6 and receivers R1-R4 disposed on tool body 301. In other embodiments, the transmitter-receiver configuration of logging tool 300c may be included on pads 305.

Referring to FIGS. 3A-3C, the transmitters may be positioned symmetrically on pads 305 or tool body 301 with respect to the receivers on dielectric tools 300, 300b, and 300c. For example, on dielectric tool 300b, the distance from T1 to R3 may be the same distance as from T2 to R2; and the distance from T1 to R1 may be the same distance as from T2 to R4. In addition, each receiver may have a spacing from its adjacent receiver such that an EM wave propagating between those receivers travels at most one half wavelength (i.e., the propagation of EM waves between each adjacent receiver has a phase shift that is no greater than 7C radians or 180° due to the formation and not taking into account internal phase shifts of the tool circuitry). Also, the spacing between R1 and R2 may not exceed one half wavelength of the EM wave propagating in formation 13. The spacing between adjacent receivers may depend on the frequency range of the dielectric tool.

As non-limiting examples, each transmitter or receiver of the multi-frequency dielectric array logging tool may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies. Each transmitter or receiver may be configured to have a limited frequency range and tuned to discrete frequencies separated by at least 50 MHz.

In one example, the tool may be a dielectric probe. Data from a dielectric probe is used in this example where the attenuation and phase shift of electromagnetic wave propagating in a formation with unknown properties is used to obtain information on various components present within it (e.g., solid matrix, water, and oil). Due to large contrast between permittivity and conductivity of water and the other components present in formation, this probe may be used for identifying the volume fraction of water (Sw) and its salinity ($R_w$).

The probe may use only a few frequencies. As an example, each transmitter or receiver may be configured to operate at a frequency range from about 35 MHz to about 1 GHz and tuned to only these discrete frequencies 35 MHz, 84 MHz, 200 MHz, 450 MHz, and 1000 MHz. Thus, each transmitter or receiver may be configured to have a bandwidth of about 1 GHz and tuned to a plurality of frequencies within that frequency band, and each tuned frequency within that band may be separated by at least 50 MHz.

Determining Archie Parameters Using a Selected Mixing Model

Aspects of the disclosure obtain the Archie parameters (e.g., cementation and saturation factors of Archie's law) from the dielectric dispersion data of the formation. Dielectric dispersion data consists of a complex quantity at each frequency of a plurality of frequencies. The real and imaginary parts of this quantity contain information on relative permittivity and conductivity at each frequency.

In order to extract the parameters of Archie's law the first step is to fit a mixing law representative of the formation using dielectric dispersion data. After obtaining the parameters of the mixing model and making sure that it is valid for low frequency range one can obtain an analytical model for DC conductivity, $\omega=0$, as follows which relates the measured effective conductivity to formation constituent.

$$\sigma_{eff} = \sigma_{eff}(S_W, \varphi, \sigma_W) \quad (24)$$

where $\sigma_{eff}(S_W, \varphi, \sigma_W)$ represents a general function that relates the DC conductivity of the formation to water saturation Sw, total porosity $\varphi$, and water conductivity $\sigma_W$, and can be obtained from any mixing law that is fitted to measured dielectric dispersion of the formation.

Equations (2) to (24) can be used to obtain the relation between effective conductivity, water conductivity, porosity and water saturation. This relation is obtained directly from the mixing model and its validity depends on how well the mixing model represents the behavior of the formation under study.

The function obtained for conductivity at DC depends on the mixing law. The parameters of the Archie's law can be chosen such that the two functions (Eqs. 2 and 24) are locally equal to each other.

For this purpose the value of the functions and their first order variation with respect to independent variables ($\varphi$) and ($S_W$) should match. For this purpose, a numerical model is generated comprising an expression ($a_1$) equating a function for the effective conductivity representative of the mixing model with respect to direct current with a representation for the effective conductivity under Archie's law with respect to direct current. Additional expressions are generated, including a second expression equating a first order variation of the representation with a first order variation of the function with respect to water saturation of the formation ($S_W$), and a third expression equating a first order variation of the representation with a first order variation of the function with respect to total porosity of the formation ($\varphi$). Here, the second expression ($a_2$) equates a derivative of the representation with a derivative of the function with respect to water saturation of the formation ($S_W$), and the third expression ($a_3$) equates a derivative of the representation with a derivative of the function with respect to porosity of the matrix of the formation ($\varphi$).

Following the procedure of the present disclosure, the parameters of Archie's law (Archie parameters) may be obtained from the dispersive behavior of the formation by solving a system of equations to obtain values for the Archie parameters, as follows:

$$\alpha_1 \equiv \sigma_{\mathit{eff}}(S_w, \varphi, \sigma_w) = \frac{1}{a}\varphi^m S_w^n \sigma_w \qquad (25)$$

$$\alpha_2 \equiv \frac{\partial \sigma_{\mathit{eff}}(S_w, \varphi, \sigma_w)}{\partial \varphi} = \frac{m}{a}\varphi^{m-1} S_w^n \sigma_w \qquad (26)$$

$$\alpha_3 \equiv \frac{\partial \sigma_{\mathit{eff}}(S_w, \varphi, \sigma_w)}{\partial S_w} = \frac{n}{a}\varphi^m S_w^{n-1} \sigma_w \qquad (27)$$

$$m = \frac{\alpha_2 \varphi}{\alpha_1} \qquad (28)$$

$$n = \frac{\alpha_3 S_w}{\alpha_1} \qquad (29)$$

where $\sigma_{\mathit{eff}}$ is conductivity at DC. The value $\sigma_{\mathit{eff}}$ can be obtained as a function of $S_W$, $\varphi$, $\sigma_W$ (and in more detailed mixing models, also as a function of texture) as shown in Equation (24).

As noted above, one benefit of the novel techniques disclosed herein is that it may be applied to any desired mixing model. The application of the method is shown for various mixing models using few examples. We start with a commonly employed mixing model, Complex Refractive Index Model (CRIM).

U.S. Pat. No. 5,144,245 to M. M. Wisler discloses the use of the Complex Refractive Index Model (CRIM) as a means for correcting resistivity measurements for dielectric effects where the resistivity amplitude and phase data are taken at a single frequency.

Although applicability of CRIM for all formation types is not certain, it is widely used in formation evaluation due to its simplicity. As shown below, analytically, this model corresponds to fixed values for Archie's parameters (m=n=2). So, conventional attempts to integrate CRIM and Archie for calculating petro-physical properties from dielectric dispersion are based on the assumption that cementation and saturation exponents have a known value of 2.

Velocity of electromagnetic wave is proportional to inverse square root of permittivity. A plane wave solution will have the form $$V = Ce^{ax}$$

where
V=a field variable;
C=a constant
e=the naperian log base
i=the square root of 1;
x=the distance traveled; and
$k = [\omega^2 \mu_o \mu_r \varepsilon_o \varepsilon_r) + (i \omega \mu_o [_r \sigma)]^{1/2}$
where:
c=the speed of light=2.999 $10^8$ (meters/second);
$\mu_o$=the magnetic permeability of free space=$4\pi \times 10^{-7}$ N/A$^2$];
$\mu_r$=the relative permeability (which is 1.0 for free space and most earth materials);
$\varepsilon_o$=the electric permittivity of free space=1/($\mu_o$ C$^2$)=8.854×10$^{-12}$ [F/m];
$\varepsilon_r$=the relative dielectric constant (which is 1.0 in free space);
$\omega$=the angular frequency of the applied field; and
$\sigma$=the conductivity.

The term k can be rewritten in terms of a relative complex dielectric constant, $$\tilde{\delta}_r = \varepsilon_r + i\sigma(1/\omega\varepsilon_o).$$

The CRIM model is a simple model that obtains the effective permittivity of a mixture based on the weighted average of its constituents. It simplifies the mixture as a layered composite with each layer having properties that correspond to a phase in the mixture and a thickness that is proportional to the volume fraction of each phase. The speed of electromagnetic wave in a material is related to the speed in vacuum through $$\frac{c}{c_0} = (\Gamma_r \tilde{\varepsilon}_r)^{-0.5}$$

where c is the speed of electromagnetic wave in material, $c_0$ the speed of electromagnetic wave in vacuum, $\Gamma_P$ is the relative permeability and $\tilde{\delta}_r$ is the complex relative permittivity. The total travel time for the electromagnetic wave is seen as the sum of the time it takes for the wave to travel in each layer (phase). Using this hypothesis and assuming the relative permeability to be the same for all phases result in $$\tilde{\varepsilon}_{\mathit{eff}}^{0.5} = \sum_{i=1}^{N} f_i \tilde{\varepsilon}_i^{0.5} \qquad (30)$$

where $\tilde{\delta}_i$ is dielectric property for each phase present in the mixture and $f_i$ is volume fraction of each phase. In case of a mixture of solid matrix (m), water (w) and hydrocarbon (h) the equation becomes $$\tilde{\delta}_{\mathit{eff}}^{0.5} = (1-\varphi)\tilde{\delta}_m^{0.5} + \varphi S_W \tilde{\delta}_W^{0.5} + \varphi(1-S_W)\tilde{\delta}_h^{0.5} \qquad (31)$$

Under direct current, only the water portion is substantially conductive, and rewriting Eq. (31) equation for its real part at frequency of zero and assuming $\sigma_m = \sigma_h = 0$ leads to $$\sigma_{\mathit{eff}}^{0.5} = \varphi S_W \sigma S_W^{0.5}. \qquad (32)$$

Comparison of the above equation to Archie's law (Eq. 2) would lead to m=n=2 and a=1. It can be shown below that application of Equations (25) to (29) leads to the same results.

First, a function for the effective conductivity representative of the mixing model with respect to direct current (g) is obtained:

$$g \equiv \frac{\sigma_{effm}}{\sigma_w} = \varphi^2 S_W^2$$

This expression of the function g is substituted in the expression $a_1$ equating a representation for the effective conductivity under Archie's law with respect to direct current with a function for the effective conductivity representative of the mixing model with respect to direct current, which results in:

$$\frac{\alpha_1}{\sigma_w} \equiv g = \phi^2 S_w^2$$

$$\frac{\alpha_2}{\sigma_w} \equiv \frac{\partial g}{\partial \phi} = 2\phi S_w^2$$

$$\frac{\alpha_3}{\sigma_w} \equiv \frac{\partial g}{\partial S_w} = 2\phi^2 S_w$$

$$m = \frac{\alpha_2 \varphi}{\alpha_1} = 2$$

and $$n = \frac{\alpha_3 S_W}{\alpha_1} = 2.$$

In another example the Maxwell-Garnett mixing model may be used for representing the dielectric dispersive behavior of the formation. This model is developed for predicting the effective dielectric properties of a mixture by assuming a first portion as a background material and the remaining portion as inclusions added to the first portion. Thus, using Maxwell-Garnett a mixing model may be expressed:

$$\frac{\varepsilon_{eff} - \varepsilon_b}{\varepsilon_{eff} + 2*\varepsilon_b} = \sum_{i=1}^{N} f_i \frac{\varepsilon_i - \varepsilon_b}{\varepsilon_i + 2*\varepsilon_b}.$$

It relates the effective dielectric property of the mixture to properties of background and inclusion, as well as volume fraction and shape of inclusions. It is assumed that the mixture comprises diluted and uniformly distributed spherical inclusions in a mixture of solid matrix, water and hydrocarbon. The shape of the components may be taken into account using the depolarization factor (N), which quantifies the amount of perturbation in electric field by replacing a portion of otherwise homogenous isotropic media with a representative inclusion. From the Klein-Swift model, it is know that $\varepsilon_W = \varepsilon_W(\omega, S, T)$, wherein $\omega$ is frequency, S is salinity of water, and T is temperature. Thus, $\varepsilon_b = \varepsilon_b(\varepsilon_m, \omega, S, S_W, \varepsilon_h, \varphi, T)$, of which $\omega$, $\varepsilon_h$, $\varphi$, and T are obtained from borehole measurements from other instruments, and wherein $\varepsilon_m$ is permittivity of the matrix, $\varepsilon_w$ is permittivity of water, $\varepsilon_h$ is permittivity of hydrocarbon. The Maxwell-Garnett mixing law is used for the mixture where the background material is assumed to follow CRIM (which implicitly assumes no texture for the background and obtains the effective property of the background based on weighted velocity of the electromagnetic wave in each medium) and the spherical inclusions are assumed to be of solid matrix.

$$\frac{\sigma_{eff} - \sigma_b}{\sigma_{eff} + 2*\sigma_b} = \sum_{i=1}^{N} f_i \frac{\sigma_i - \sigma_b}{\sigma_i + 2*\sigma_b} \quad (33)$$

Using the above equation and assigning $\sigma_{CRIM} = \varphi^2 S_W^2 \sigma_W$ as property of background and noting that $\sigma_1 = 0$ based on assuming solid matrix as the inclusions would lead to $$\frac{\sigma_{eff} - \varphi^2 S_W^2 \sigma_w}{\sigma_{eff} + 2*\varphi^2 S_W^2 \sigma_w} = \eta \frac{0 - \varphi^2 S_W^2 \sigma_w}{0 + 2*\varphi^2 S_W^2 \sigma_w} \quad (34)$$

where $\eta$ is the volume fraction of the spherical inclusions.

$$\sigma_{eff} = \left(\frac{1-\eta}{1+\frac{\eta}{2}}\right) \varphi^2 S_W^2 \sigma_w \quad (35)$$

Using Eqs. 25 to 29 results in $$\alpha_1 \equiv \sigma_{eff}(S_W, \varphi, \sigma_W) \quad (36)$$

$$\alpha_2 \equiv \frac{\partial \sigma_{eff}(S_W, \varphi, \sigma_W)}{\partial \varphi} = 2\left(\frac{1-\eta}{1+\frac{\eta}{2}}\right) \varphi^2 S_W^2 \sigma_w \quad (37)$$

$$\alpha_3 \equiv \frac{\partial \sigma_{eff}(S_W, \varphi, \sigma_W)}{\partial S_W} = 2\left(\frac{1-\eta}{1+\frac{\eta}{2}}\right) \varphi^2 S_W \sigma_w \quad (38)$$

which leads to m=n=2 and $$a = \frac{1+\frac{\eta}{2}}{1-\eta}.$$

In a third example, an effort to characterize the texture of rock using the effect of shape of inclusions is considered. It is assumed that inclusions follow the shape of ellipsoids of revolution and they are randomly oriented and uniformly distributed. The background is assumed to follow CRIM while the inclusions are assumed to be water. Maxwell-Garnett is used as follows $$\epsilon_{eff} = \epsilon_{eff}(p, T, \sigma_w, \varphi, S_w, \epsilon_n, \epsilon_m, \epsilon_w, N) \quad (39)$$

$$\sigma_{eff} = \sigma_b \left(1 + \frac{\frac{f}{3} \sum_{j=x,y,z} \frac{\sigma_i - \sigma_b}{\sigma_b + N_j(\sigma_i - \sigma_b)}}{1 - \frac{f}{3} \sum_{j=x,y,z} \frac{N_j(\sigma_i - \sigma_b)}{\sigma_b + N_j(\sigma_i - \sigma_b)}}\right) \quad (40)$$

where N is shape factor related to depolarization factor of the inclusion. For inclusions in the shape of ellipsoids the depolarization factor $N_j$ (j=x, y, z) along axes j can be written as $$N_j = \frac{abc}{2} \int_0^\infty \frac{ds}{(s+j^2)\sqrt{(s+a^2)(s+b^2)(s+c^2)}} \quad (41)$$

where a, b, c are the axes of ellipsoid along x, y and z axes respectively. In order to simplify the equations the shape of inclusions is assumed to be ellipsoids of revolution (with the main axis of a, b=c). This shape covers important inclusion shapes like spheres (a=b=b), disk (b=c>>a) and needle (a>>b=c). This would lead to $$N_a = \frac{abc}{2} \int_0^\infty \frac{ds}{(s+a^2)\sqrt{(s+a^2)(s+b^2)(s+c^2)}} \quad (42)$$

$$N_b = N_c = 0.5(1 - N_a) \quad (43)$$

For spherical inclusions $N_x = N_y = N_z = \frac{1}{3}$, for inclusions in the shape if thin disks in the plane of y-z, $N_x=1$, $N_y=N_z=0$ and for inclusions that resemble long needles with the long axis along x axis, $N_x=0$, $N_y=N_z=\frac{1}{2}$.

The volume fraction of water that is present in inclusions is assumed to be $\eta \varphi S_W$ where $0 < \eta < 1$ is the portion of water that is represented as the inclusion. The conductivity of water is assumed to follow CRIM where modifications are implemented on the volume fractions to include only the portion of water that is assigned to the background (e.g., the portion without any particular shape).

$$\sigma_b = \sigma_w \left( \frac{(1-\eta)^2 \varphi^2 S_W^2}{(1-\eta\varphi S_W)^2} \right) \quad (44)$$

$$m = (a_4 a_5 + a_6 a_7)/a_8$$

$$a_1 = \frac{1}{p(1-N_x) + N_x}$$

$$a_2 = \frac{1}{p(1-N_y) + N_y}$$

$$a_3 = \frac{1}{q(1-p)}$$

$$a_4 = \frac{2\varphi S_W^2}{(1-\eta\varphi S_W)^3}[(1-\eta)^2(1-\eta\varphi S_W) + (1-\eta^2)\eta\varphi S_W]$$

$$a_5 = 1 + \frac{a_1 + 2a_2}{3a_3 - N_x a_1 - 2a_2 N_y} + p \frac{-(1-N_x)a_1^2 - 2(1-N_y)a_2^2}{3a_3 - N_x a_1 - 2N_y a_2} +$$
$$p \frac{-[a_1 + 2a_2][3qa_3^2 + N_x(1-N_x)a_1^2 + 2N_y(1-N_y)a_2^2]}{(3a_3 - N_x a_1 - 2a_2 N_y)^2}$$

$$a_6 = 3p \frac{(a_1 + 2a_2)(1-p)a_3^2}{(3a_3 - N_x a_1 - 2N_y a_2)^2}$$

$$a_7 = \eta S_W$$

$$a_8 = \frac{p\left(1 + \frac{a_1 + 2a_2}{3a_3 - N_x a_1 - 2a_2 N_y}\right)}{\varphi}$$

$$p = \frac{(1-\eta)^2 \varphi^2 S_W^2}{(1-\eta\varphi S_W)^2}$$

$$q = \eta \varphi S_W$$

Equations 25, 26 and 28 can be used to obtain the cementation factor. Determination of $\alpha_2$ can be done either numerically or analytically. Appendix A provides the analytic derivation of $\alpha_2$. The same procedure can be used for obtaining the saturation exponent.

Using complex measurements of the effective dielectric at multiple frequencies, the equations of the mixing model may be fit to the dispersion curve to obtain values for $\varepsilon_m$, S, and $S_W$. For example, the multi-frequency dispersion data may be inverted, correcting for environmental pressure (p) and temperature (7). At least three equations may be applied to the three unknowns. However, because five complex equations may be considered as ten separate equations, the problem is overdefined, and a least square fit may be determined. In more detailed mixing models the number of unknown parameters increase, and thus more equations (and hence more measurements at more frequencies) are needed. Using the determined parameters for the selected mixing model and the given value of total porosity, the system of equations may be solved for values of the Archie parameters. For example, texture may be solved for by solving for the value N. If the formation's conductivity can be correctly modeled by a mixing model, obtaining Archie's parameters amount to fitting this mixing model to the Archie model at each combination of total porosity and water saturation. Parameters reflective of the texture of the formation may be solved, and correlations between particular gross textural features or textural parameters and other parameters may be modeled and used to estimate gross textural features or textural parameters based on measurements of the formation.

Figure 4A:
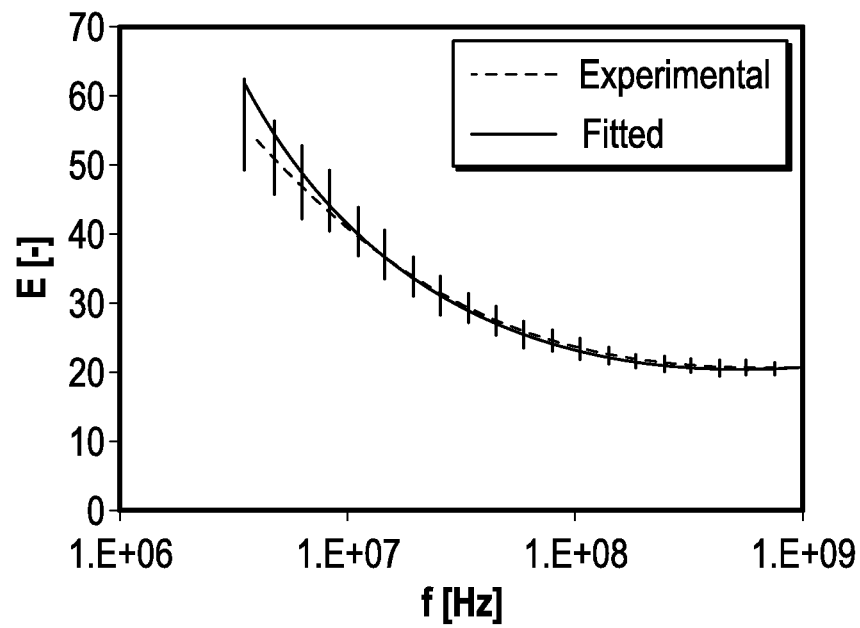
FIGS. 4A & 4B illustrate the application of the techniques of the present disclosure to dielectric dispersion data.
Figure 4B:
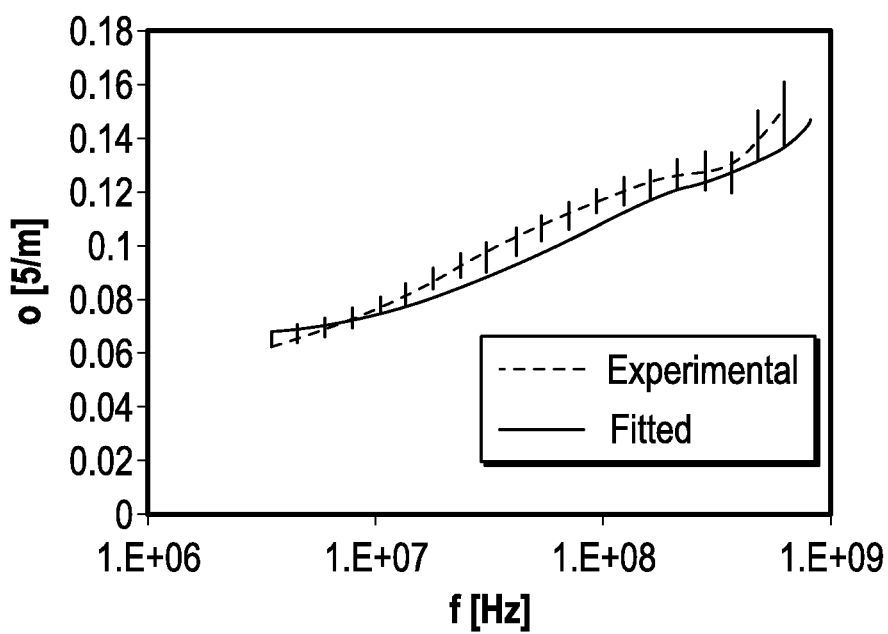

FIGS. 4A & 4B illustrate the application of the techniques of the present disclosure to dielectric dispersion data. FIGS. 4A & 4B show the dispersive behavior of permittivity and conductivity, respectively, for a formation along with the error bars reported. The Maxwell-Garnett mixing model, as described above, is used to fit to $\varepsilon$ and $\sigma$. Comparing the parameters of fit with the experimental data in Table 1, we see close agreement.

TABLE 1

|   | Experimental* | Fitted |
|---|---|---|
| $\sigma_w$ | 1.07 | 1.02 |
| m | 2.3 | 2.4 |

*Kenyon, W. E., "Texture effects on megahertz dielectric properties of calcite rock samples", J. Appl. Phys. 55 (8), 1984.

The porosity of $\varphi=0.3$ is used in the calculations, as reported by test data. Equations (25), (26), (28) as well as A1 were used in calculating the cementation factor m, which shows a good agreement with the reported experimental values.

Figure 5A:
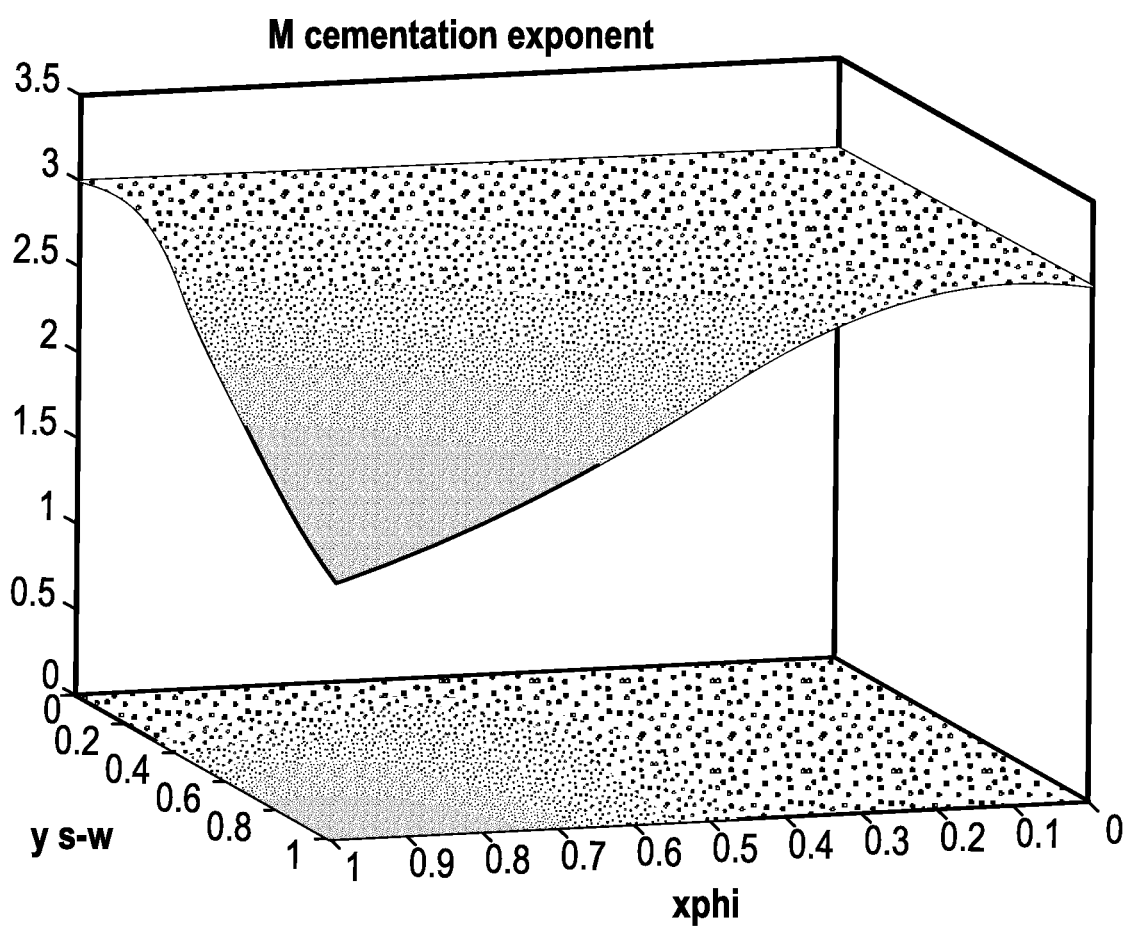
FIGS. 5A-5C illustrate values for the cementation exponent consistent with the solved system of equations for various mixing models in accordance with embodiments of the present disclosure.
Figure 5B:
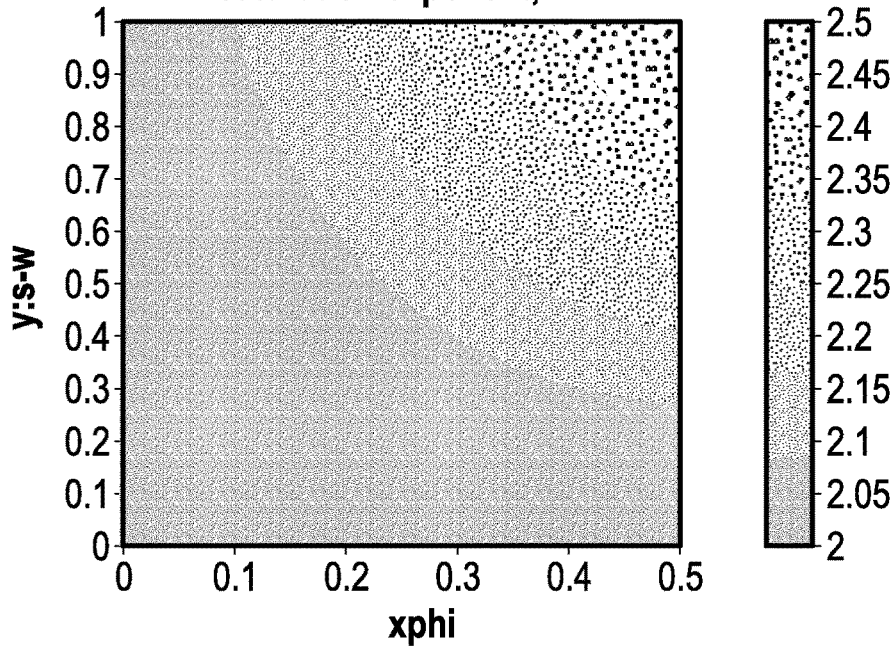
Figure 5C:
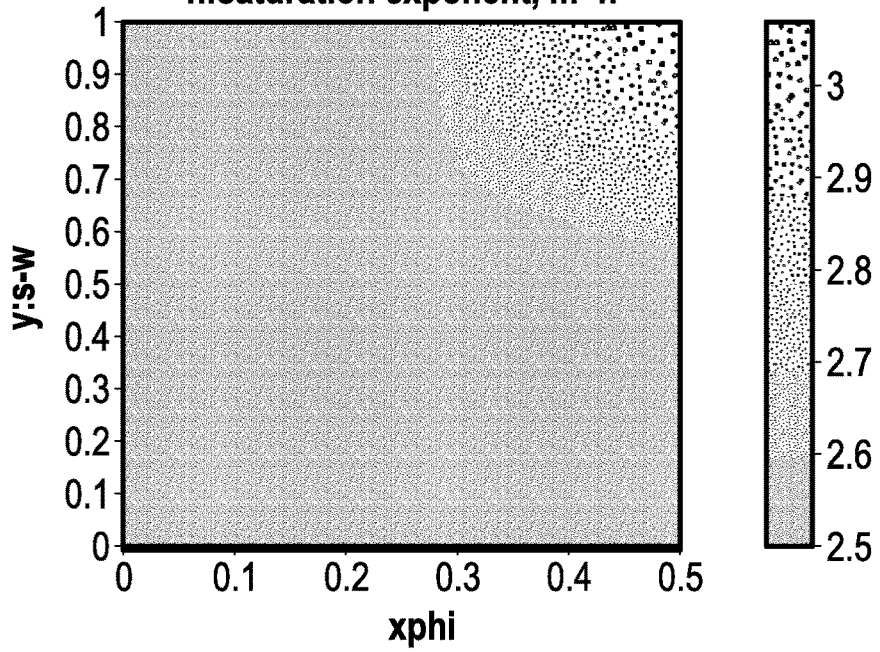

FIGS. 5A-5C illustrate values for the cementation exponent consistent with the solved system of equations for various mixing models in accordance with embodiments of the present disclosure. The solved for values of the Archie parameters may be obtained using the solved solution space and the values of total porosity and water saturation estimated by fitting the equations of the mixing model to the dispersion curve data. FIG. 5B shows values derived from Bruggeman's mixing formula for less diluted suspension of spheres (e.g., small $\varphi$ and $S_W$). FIG. 5C shows values derived from Maxwell's mixing formula for a strongly diluted suspension of spheres (e.g., large $\varphi$ and $S_W$). Particular choice of mixing model here has led to cementation and saturation factors being equal. This is merely a result of mixing model used and is not true for a general mixing model. The current method is capable of estimating both saturation and cementation factor without any restrictive assumption on their dependency.

FIGS. 6A-6D illustrate the effect of texture on measurements. For a simulation results are shown for various tool measurements for different textures (signified by aspect ratio) while holding the formation parameters constant. The constant parameters for the simulation are:

| | |
|---|---|
| $\varepsilon_m$ | 7.5 |
| $\varepsilon_h$ | 2 |
| $S_W$ | 0.7 |
| $\varphi$ | 0.3 |
| T[Celsius] | 0 |
| $\sigma_w$ [S/m] | 0.1, 1, 5 |
| $\eta$ | 10% |
| e (aspect ratio of inclusions) | $1e^{-4}$, 1. |

Figure 6A:
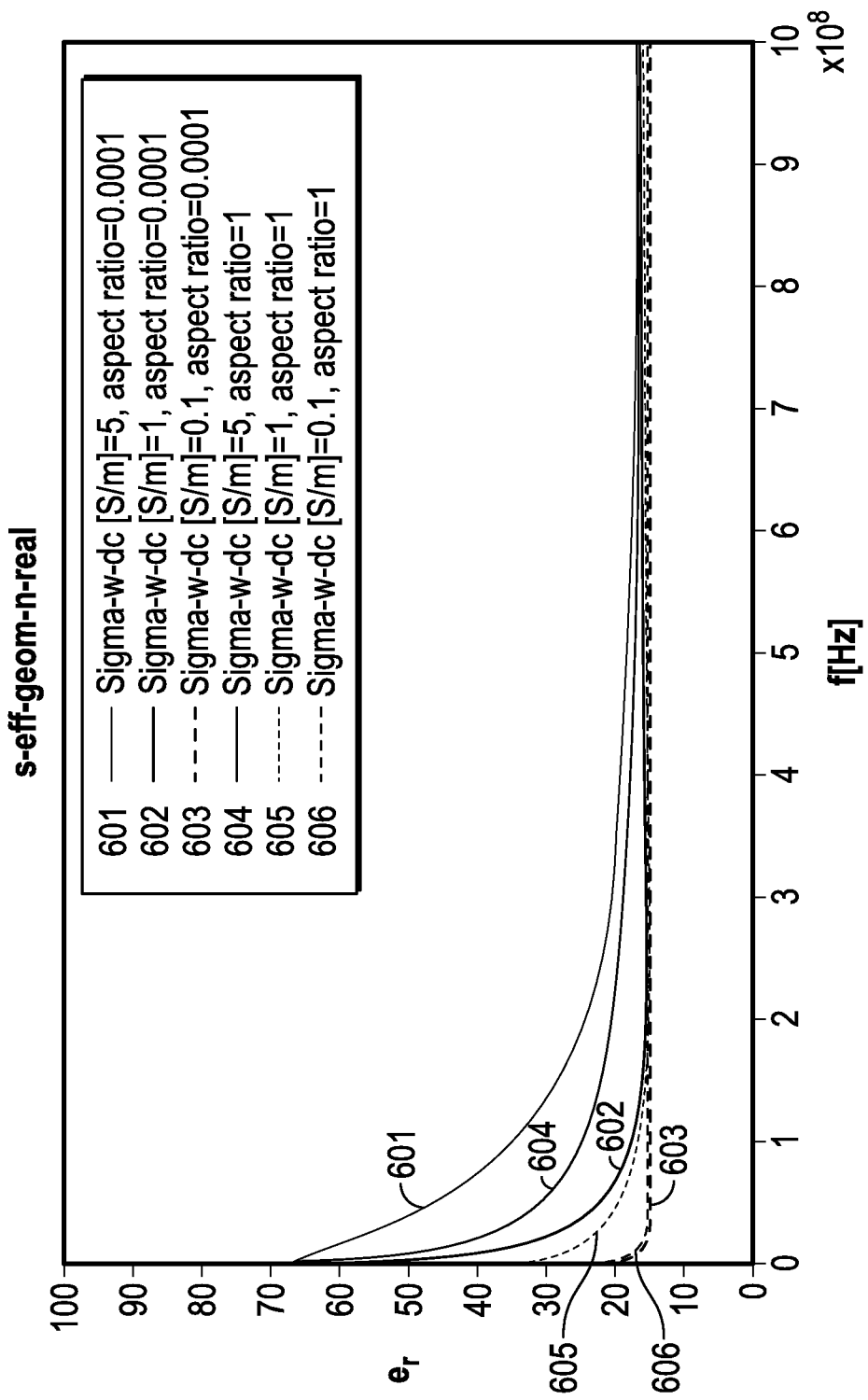
FIGS. 6A-6D illustrate the effect of texture on measurements.

FIG. 6A shows several curves 701-706 graphically illustrating a relationship of effective permittivity with respect to frequency for particular values of DC water conductivity and aspect ratio. Curves 701-703 reflect a volume featuring spherical grains and having a conductivity of 5, 1, and 0.1 S/m, respectively. Curves 704-706 reflect a volume featuring disk like grains and having a conductivity of 5, 1, and 0.1 S/m, respectively.

Figure 6B:
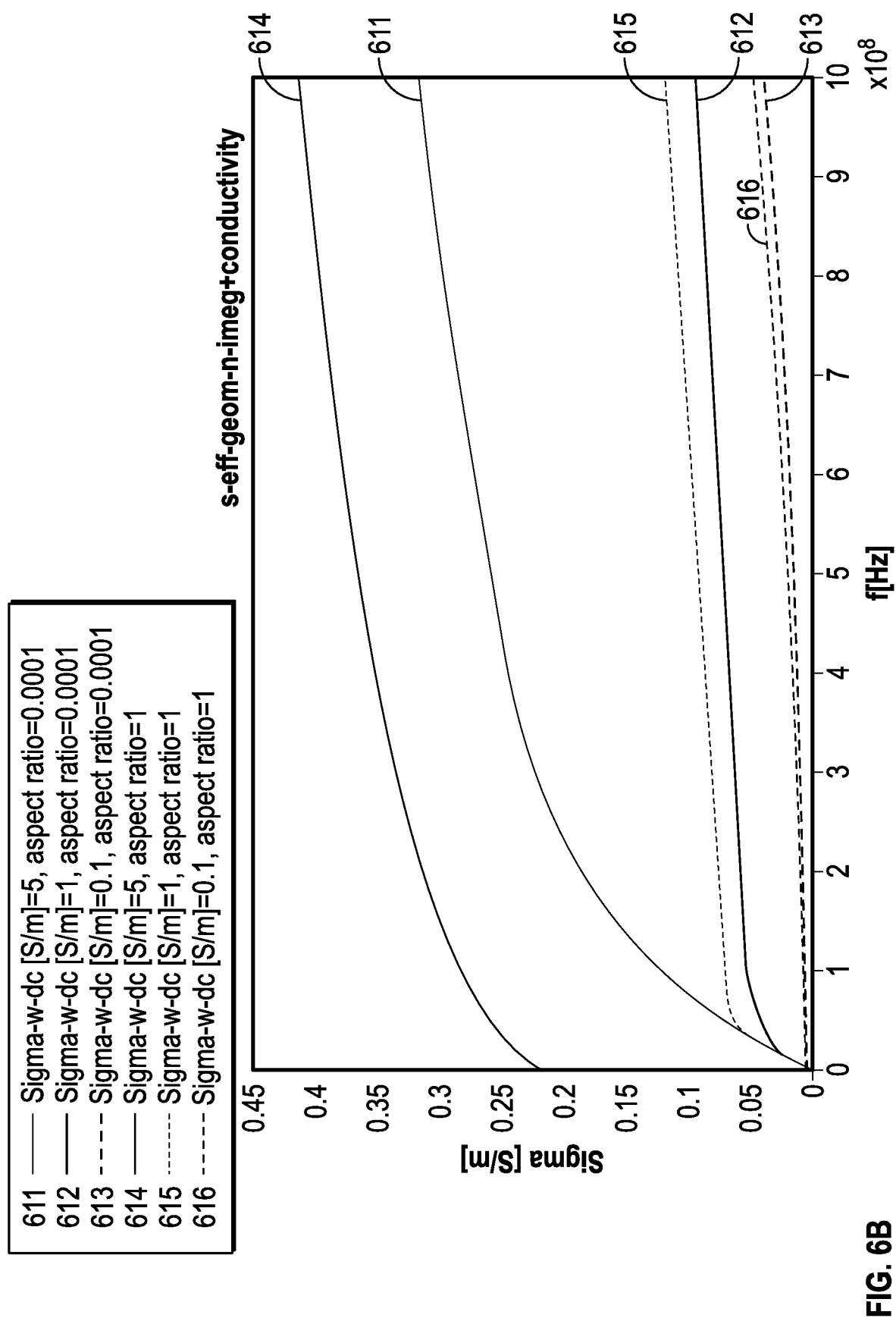

FIG. 6B shows several curves 711-716 graphically illustrating a relationship of effective conductivity with respect to frequency for particular values of DC water conductivity and aspect ratio. Curves 711-713 reflect a volume featuring spherical grains and having a conductivity of 5, 1, and 0.1 S/m, respectively. Curves 714-716 reflect a volume featuring disk like grains and having a conductivity of 5, 1, and 0.1 S/m, respectively.

Figure 6C:
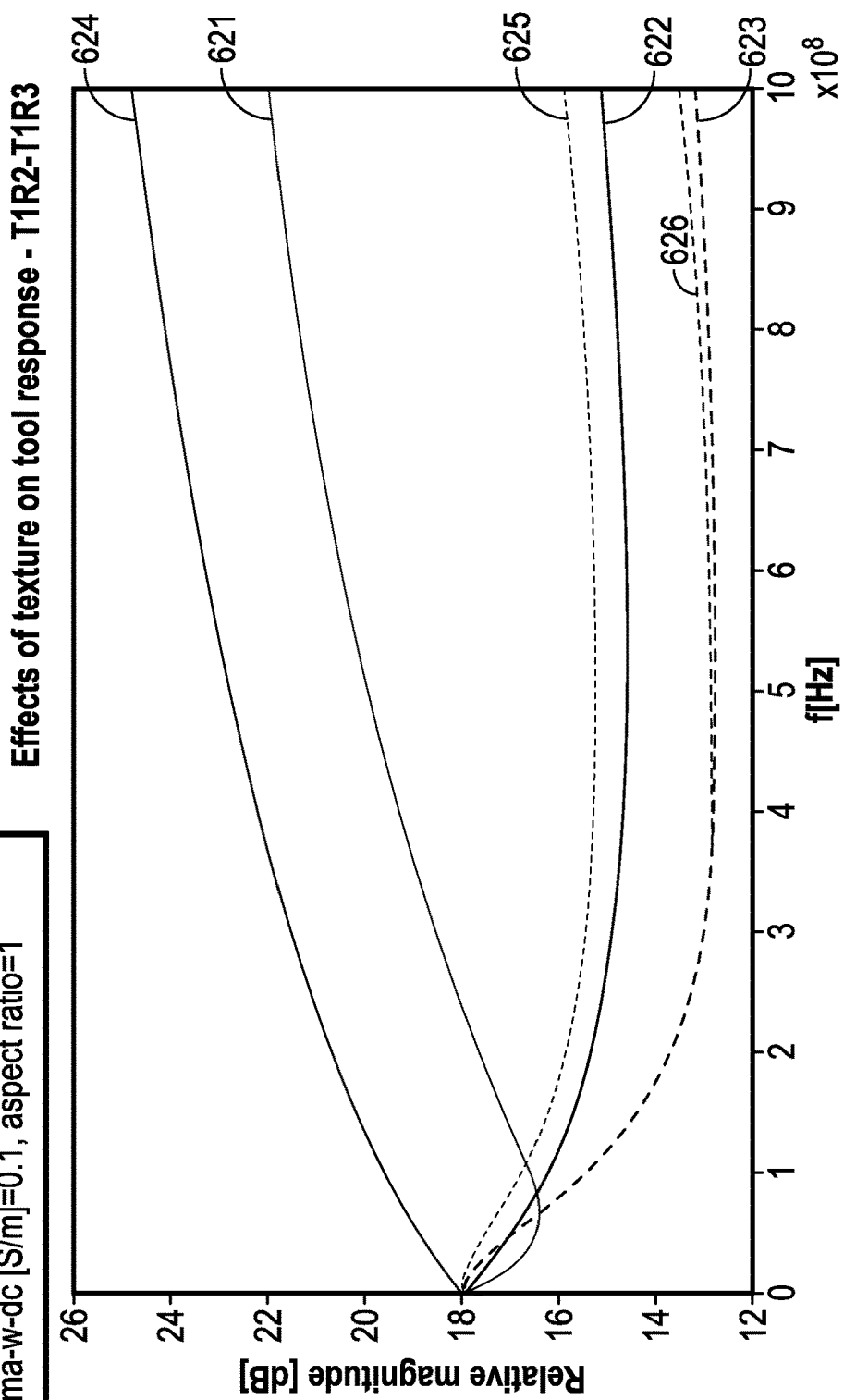

FIG. 6C shows several curves 721-726 graphically illustrating a relationship of the relative magnitude of tool response with respect to frequency for a T1R2-T1R3 relative phase tool for particular values of DC water conductivity and aspect ratio. Curves 721-723 reflect a volume featuring spherical grains and having a conductivity of 5, 1, and 0.1 S/m, respectively. Curves 724-726 reflect a volume featuring disk like grains and having a conductivity of 5, 1, and 0.1 S/m, respectively.

Figure 6D:
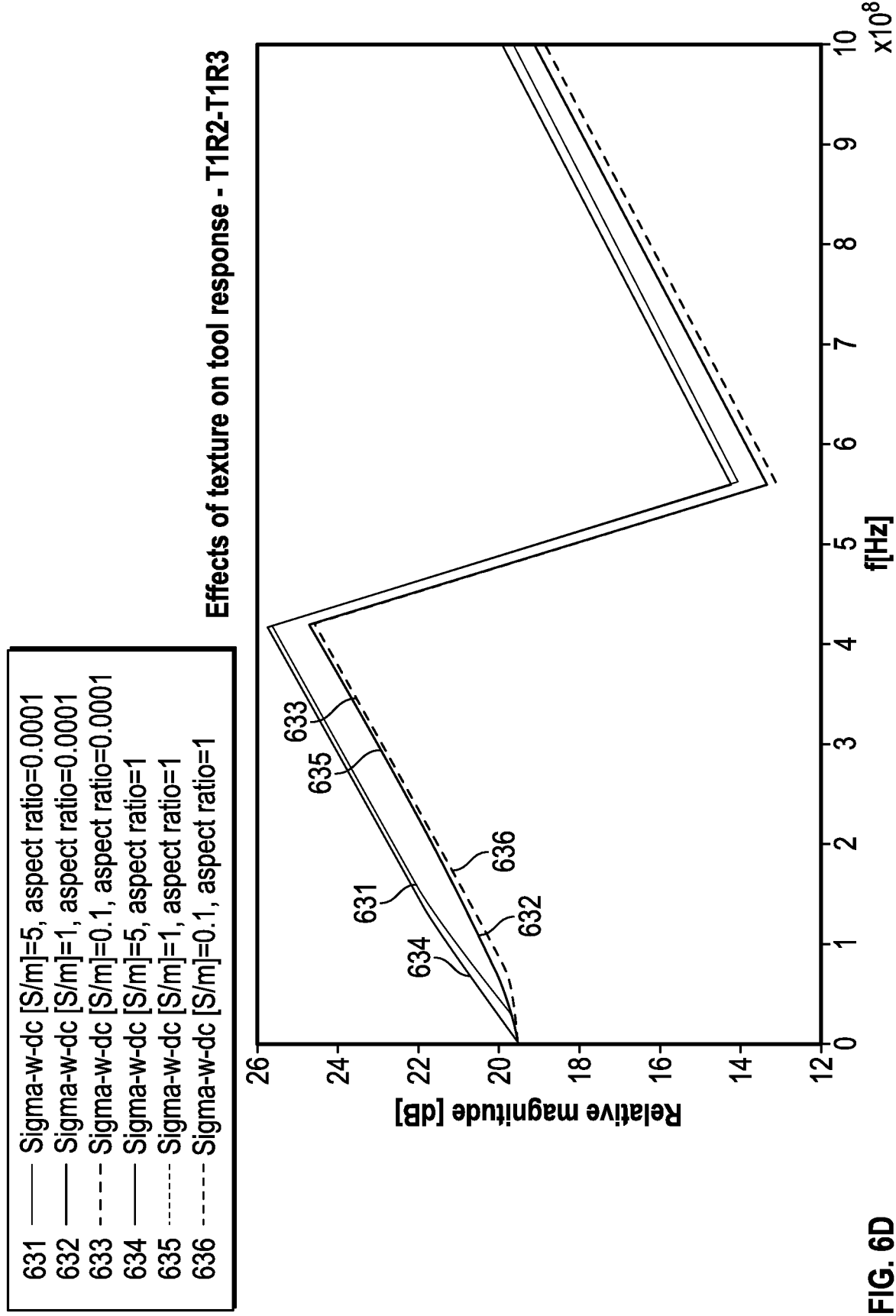

FIG. 6D shows several curves 731-736 graphically illustrating a relationship of the relative phase of tool response with respect to frequency for a T1R2-T1R3 relative phase tool for particular values of DC water conductivity and aspect ratio. Curves 731-733 reflect a volume featuring spherical grains and having a conductivity of 5, 1, and 0.1 S/m, respectively. Curves 734-736 reflect a volume featuring disk like grains and having a conductivity of 5, 1, and 0.1 S/m, respectively. Note that, at high frequencies, the relative phase is insensitive to water salinity for $\sigma_W$<1 [S/m], but remains sensitive to texture.

Figure 7:
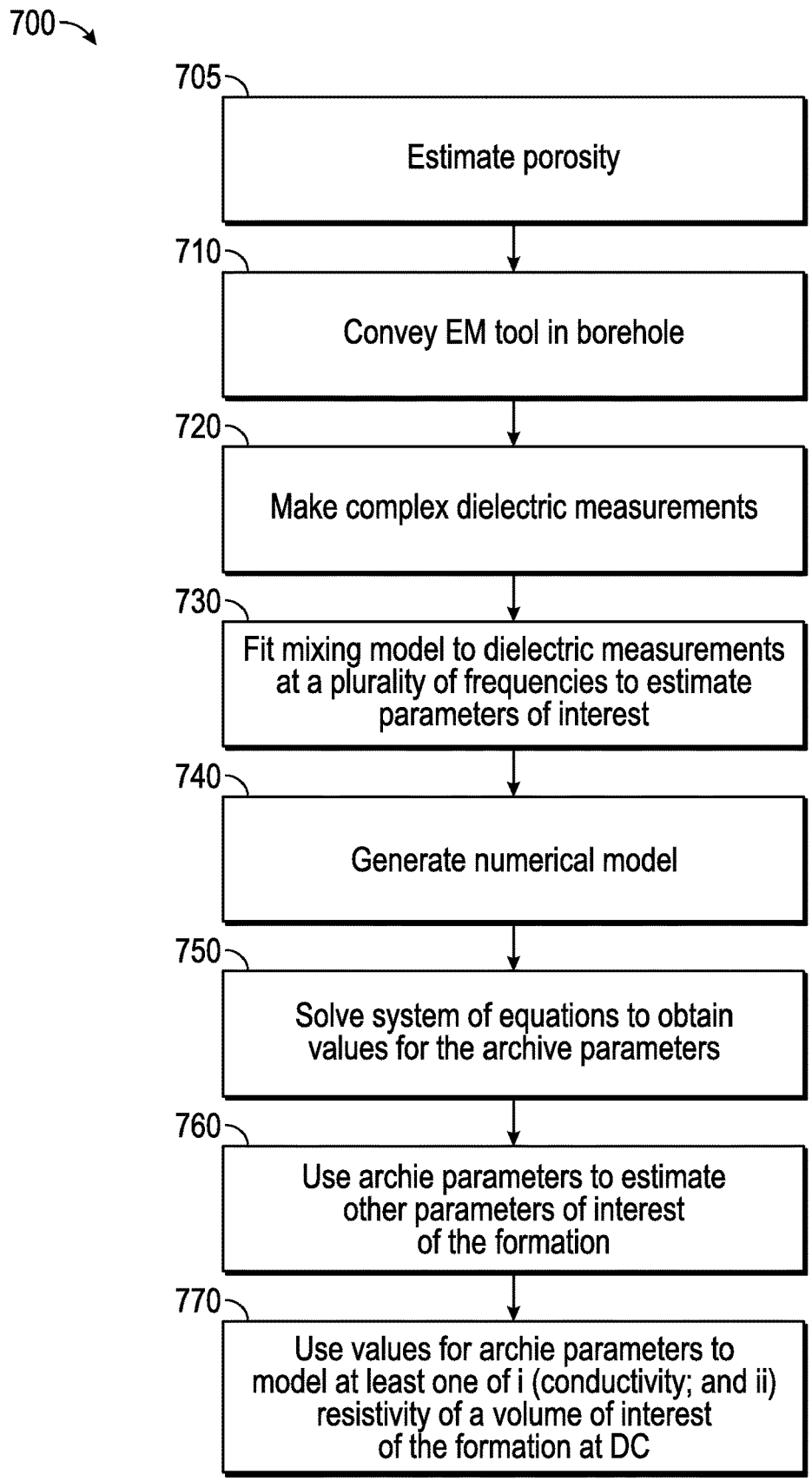
FIG. 7 illustrates a method for evaluating an earth formation having an effective conductivity characterized by Archie's law using complex dielectric measurements.

FIG. 7 illustrates a method 700 for evaluating an earth formation having an effective conductivity characterized by Archie's law using complex dielectric measurements. The complex dielectric measurements may be modeled using a selected mixing model approximating the dielectric behavior of the formation. At optional step 705, the method may begin by estimating porosity values of a volume of interest in a borehole proximate the volume of interest of an earth formation. At optional step 710, the method may include conveying an electromagnetic tool in a borehole proximate a volume of interest of an earth formation. Conveying the tool may include conveying the tool on a drillstring by rotating a drillbit on a bottom hole assembly (BHA) at the distal end of the drill string to extend the borehole, tripping the tool on a wireline, and so on. At optional step 720, the method may include making complex dielectric measurements of the volume of interest in the borehole. Step 720 may be carried out by exciting one or more transmitters in the borehole at at least one frequency, which may include a plurality of frequencies, receiving signals at a plurality of receivers responsive to the excitation, and processing the signals to generate measurements. Steps 710 and 720 may be carried out by using at least one processor to direct the carrier or other drilling or borehole equipment, or control the transmitters, either directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., a propagating wave). Making measurements may include estimating a phase shift associated with one or more signals. An inversion may be carried out by inverting for permittivity and conductivity using a wholespace model as an initial guess. In the whole space inversion, first the synthetic tool response in an isotropic whole-space model, i.e., without horizontal or vertical boundaries, is calculated. The synthetic whole-space response is then compared with measured field data at each logging depth and the respective parameter values are adjusted to match the synthetic responses with the measured field responses. In performing the match, other drilling or measurement parameters may also be used as input parameters.

Optional step 730 may include fitting a mixing model to dielectric measurements at a plurality of frequencies to estimate values for parameters of interest of the volume, such as, for example, salinity of the water of the formation, water saturation of the formation, and permittivity of the rock matrix of the formation. This may include performing an inversion.

Step 740 includes generating a numerical model comprising an expression equating a representation for the effective conductivity under Archie's law with respect to direct current with a function for the effective conductivity representative of the mixing model with respect to direct current, wherein the representation comprises an Archie equation comprising a plurality of unknown Archie parameters.

Step 750 includes solving a system of equations to obtain values for the Archie parameters. The system of equations may include i) the expression; ii) a second expression equating a first order variation of the representation with a first order variation of the function with respect to water saturation of the formation (Sw); iii) a third expression equating a first order variation of the representation with a first order variation of the function with respect to porosity of the formation ($\varphi$). In some embodiments, the second expression equates a derivative of the representation with a derivative of the function with respect to water saturation of the formation (Sw), and the third expression equates a derivative of the representation with a derivative of the function with respect to porosity of the matrix of the formation ($\varphi$). Step 750 may include using the estimated values for salinity of the water of the formation, water saturation of the formation (Sw), and permittivity of the rock matrix of the formation to solve the system of equations, as described above. Step 750 may be carried out by using the estimated value for the porosity of the matrix of the formation (total porosity).

Optional step 760 may include using the values of the Archie parameters to estimate other parameters of interest of the formation, including formation properties, such as, for example, resistivity and/or conductivity. Optional step 770 may include using the values for the Archie parameters to model at least one of i) the conductivity of a volume of interest of the formation at DC, and ii) the resistivity a volume of interest of the formation at DC.

Other, optional, steps may include evaluating the formation or modeling the formation using the parameters of interest, conducting secondary recovery operations in dependence upon the estimated parameters, the model, a location of a boundary, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest).

FIG. 8 shows an information processing system 800, which may be implemented with a hardware environment that includes a processor 801, an information storage medium 810, an input device 820, processor memory 830, and may include peripheral information storage medium 840. The hardware environment may be in the well, at the rig, or at a remote location. Moreover, the several components of the hardware environment may be distributed among those locations. The input device 820 may be any data reader or user input device, such as data card reader, keyboard, USB port, etc. The information storage medium 810 stores information provided by the detectors. Information storage medium 810 may include any non-transitory computer-readable medium for standard computer information storage, such as a USB drive, memory stick, hard disk, removable RAM, EPROMs, EAROMs, flash memories, optical disks, hard disks, or other commonly used memory storage system known to one of ordinary skill in the art including Internet or network based storage. Information storage medium 810 stores a program that when executed causes information processor 801 to execute the disclosed methods. Information storage medium 810 may also store the formation information provided by the user, or the formation information may be stored in a peripheral information storage medium 840, which may be any standard computer information storage device, such as a USB drive, memory stick, hard disk, removable RAM, or other commonly used memory storage system known to one of ordinary skill in the art including Internet or network based storage. Processor 801 may be any form of processor or mathematical processing hardware, including Internet or network based hardware. When the program is loaded from information storage medium 810 into processor memory 830 (e.g. computer RAM), the program, when executed, causes information processor 801 to retrieve sensor information from either information storage medium 810 or peripheral information storage medium 840 and process the information to estimate a parameter of interest. Information processor 801 may be located on the surface or downhole (e.g., downhole tool 100).

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

Implicit in the processing of data is the use of a computer program implemented on a suitable non-transitory machine-readable medium (non-transitory computer-readable medium) that enables the processor to perform the control and processing. The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

As used above, a processor is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

"Substantially different" as used herein means not substantially the same. "Substantially the same," or "substantially similar" as used herein means a value consistent with a general formation structure or feature, or having a value within a common statistical deviation, such as within one standard deviation, within 5 percent, within 1 percent of a moving average and so on. Substantially the same refers to values within the generally held value for common deviation, such as, for example, due to noise.

The term "pad," as used herein, refers to that part of a logging tool that is pressed firmly against the borehole wall and holds sensors (e.g. an antenna assembly according to embodiments of this disclosure) to measure the parameter of interest of the earth formation.

The pad may be extended from the tool body on an arm (e.g. pad 305 of FIG. 3A) or may be incorporated into the tool body (e.g. body 301 of FIGS. 3A-3C).

As described herein, "complex permittivity" refers to a permittivity having a real part, which is commonly called the dielectric constant, and an imaginary part, which is commonly called the dielectric loss factor or loss tangent. As described herein, the terms "cementation exponent" and "saturation exponent" refer to parameters of Archie's law including the exponent m and the exponent n, respectively.

The term "mixing model" refers a quantitatively expressed relation between the dielectric behavior of a mixture and the properties of its constituents. More specifically, in the context of the present disclosure, these constituents refer to the rock matrix of the formation and the water and hydrocarbon within. The relation may include details such as the volume fraction of each of these phases, their geometry and distribution within a representative volume of the formation.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

APPENDIX A

The analytic derivation of $$\alpha_2 = \frac{\partial \sigma_{\mathit{eff}}(S_W, \varphi, \sigma_W, N)}{\partial \varphi}$$

for a Maxwell-Garnett mixing model with elliptical inclusions with water as inclusion and CRIM as background is presented in this section. First, in order to show the independence of the cementation factor from water conductivity Equation 28 is rearranged as below $$m = \frac{(\alpha_2/\sigma_W)\varphi}{\alpha_1/\sigma_W} \tag{A1}$$

where using Equations 40 and 44

$$\frac{\alpha_1}{\sigma_W} = \frac{\sigma_{\mathit{eff}}}{\sigma_W} = P\left(1 + \frac{a_1 + 2a_2}{3a_3 - N_x a_1 - 2a_2 N_y}\right) \tag{A2}$$

$$\frac{\alpha_2}{\sigma_W} = \frac{1}{\sigma_W}\frac{\partial \sigma_{\mathit{eff}}}{\partial \varphi} = \frac{1}{\sigma_W}\left(\frac{\partial \sigma_{\mathit{eff}}}{\partial p}\frac{dp}{d\varphi} + \frac{\partial \sigma_{\mathit{eff}}}{\partial q}\frac{dq}{d\varphi}\right) \tag{A3}$$

$$\frac{1}{\sigma_W}\frac{\partial \sigma_{\mathit{eff}}}{\partial p} = \tag{A4}$$

$$1 + \frac{a_1 + 2a_2}{3a_3 - N_x a_1 - 2a_2 N_y} + p\frac{-(1 - N_x)a_1^2 - 2(1 - N_y)a_2^2}{3a_3 - N_x a_1 - 2N_y a_2} +$$

$$p\frac{-[a_1 + 2a_2][3qa_3^2 + N_x(1 - N_x)a_1^2 + 2N_y(1 - N_y)a_2^2]}{(3a_3 - N_x a_1 - 2a_2 N_y)^2}$$

$$\frac{dp}{d\varphi} = \frac{2\varphi S_W^2}{(1 - \eta\varphi S_W)^3}[(1 - \eta)^2(1 - \eta\varphi S_W) + (1 - \eta^2)\eta\varphi S_W] \tag{A5}$$

$$\frac{1}{\sigma_W}\frac{\partial \sigma_{\mathit{eff}}}{\partial p} = 3p\frac{(a_1 + 2a_2)(1 - p)a_3^2}{(3a_3 - N_x a_1 - 2N_y a_2)^2} \tag{A6}$$

$$\frac{dq}{d\varphi} = \eta S_W \tag{A7}$$

$$a_1 = \frac{1}{p(1 - N_x) + N_x} \tag{A8}$$

$$a_2 = \frac{1}{p(1 - N_y) + N_y} \tag{A9}$$

$$a_3 = \frac{1}{q(1 - p)} \tag{A10}$$

$$p = \frac{(1 - \eta)^2\varphi^2 S_W^2}{(1 - \eta\varphi S_W)^2} \tag{A11}$$

$$q = \eta\varphi S_W \tag{A12}$$

It is evident that the limit of $\eta \to 0$ where no inclusions are assumed and the mixture is entirely comprised of the background material (which was assumed to follow CRIM). The value for the cementation exponent also converges to the value obtained for CRIM; $m \to 2$.

What is claimed is:

1. A method for evaluating an earth formation having an effective conductivity characterized by Archie's law using complex dielectric measurements, wherein the complex dielectric measurements are modeled using a mixing model approximating the dielectric behavior of the formation, the method comprising:
   obtaining dielectric measurements at a plurality of frequencies in the earth formation;
   generating a numerical model comprising an expression equating a representation for the effective conductivity under Archie's law with respect to direct current with a function for the effective conductivity representative of the mixing model with respect to direct current, wherein the representation comprises an Archie equation comprising a plurality of unknown Archie parameters;
   solving a system of equations to obtain values for the Archie parameters, the system of equations comprising at least:
   i) the expression;
   ii) a second compression equating a first order variation of the representation with a first order variation of the function with respect to water saturation of the formation ($S_W$); and
   iii) a third expression equating a first order variation of the representation with a first order variation of the function with respect to porosity of the formation ($\varphi$); and
   wherein solving the system of equations comprises fitting the mixing model to the dielectric measurements at the plurality of frequencies to estimate values for salinity of the water of the formation, water saturation of the formation ($S_W$), and permittivity of the rock matrix of the formation;
   using the values for the Archie parameters to estimate a parameter value for at least one parameter of interest comprising at least one of i) the conductivity of a volume of interest of the formation for direct current (DC), and ii) the resistivity of a volume of interest of the formation for DC;
   modeling the earth formation by associating the estimated parameter value for the at least one parameter of interest with the volume of interest in an other model of the earth formation stored as information on a non-transitory machine-readable medium;
   rendering the other model of the earth formation on a display;
   determining, based on estimated parameters values for at least one parameter of interest, one or more secondary recovery operations including at least one of a drilling operation, an injection operation, and a production operation; and
   executing the one or more secondary recovery operations.

2. The method of claim 1 wherein the second expression equates a derivative of the representation with a derivative of the function with respect to water saturation of the formation ($S_W$), and a third expression equates a derivative of the representation with a derivative of the function with respect to porosity of the matrix of the formation ($\varphi$).

3. The method of claim 1 wherein solving the system of equations to obtain values for Archie parameters comprises using an estimated value for the porosity of the matrix of the formation ($\varphi$).

4. The method of claim 1 wherein solving the system of equations to obtain values for the Archie parameters comprises using the estimated values for salinity of the water of the formation, water saturation of the formation ($S_W$), to solve the system of equations.

5. The method of claim 1 wherein generating the numerical model using the mixing model is independent of a choice of particular mixing model.

6. The method of claim 1 where generating the numerical model is performed without any assumed values for any of the Archie parameters.

7. The method of claim 1 further comprising avoiding extrapolation of a measured resistivity of the formation.

8. The method of claim 1 comprising conducting further operations in the formation in dependence upon the estimated parameter of interest.

9. The method of claim 1 comprising performing at least one of the following: i) displaying the values for the Archie parameters; ii) recording the values for the Archie parameters; and iii) transmitting the values for the Archie parameters.

10. The method of claim 1 wherein the complex dielectric measurements are taken at a plurality of radial depths of investigation.

11. The method of claim 10 wherein water saturation is the same at each radial depth of investigation of the plurality.

12. An apparatus for evaluating an earth formation having an effective conductivity characterized by Archie's law using complex dielectric measurements, wherein the complex dielectric measurements are modeled using a mixing model approximating the dielectric behavior of the formation, the apparatus comprising:
   at least one processor; and
   a display operatively connected to the at least one processor,
   the at least one processor configured to:
   obtain dielectric measurements at a plurality of frequencies in the earth formation;
   generate a numerical model comprising an expression equating a representation for the effective conductivity under Archie's law with respect to direct current with a function for the effective conductivity representative of the mixing model with respect to direct current, wherein the representation comprises an Archie equation comprising a plurality of unknown Archie parameters;
   solve a system of equations to obtain values for the Archie parameters, the system of equations comprising at least:
   i) the expression;
   ii) a second compression equating a first order variation of the representation with a first order variation of the function with respect to water saturation of the formation ($S_W$); and
   iii) a third expression equating a first order variation of the representation with a first order variation of the function with respect to porosity of the formation ($\varphi$); and
   wherein solving the system of equations comprises fitting the mixing model to the dielectric measurements at the plurality of frequencies to estimate values for salinity of the water of the formation, water saturation of the formation ($S_W$), and permittivity of the rock matrix of the formation;
   use the values for the Archie parameters to estimate a parameter value for at least one parameter of interest comprising at least one of i) the conductivity of a volume of interest of the formation for direct current (DC), and ii) the resistivity of a volume of interest of the formation for DC;

model the earth formation by associating the estimated parameter value for the at least one parameter of interest with the volume of interest in an other model of the earth formation stored as information on a non-transitory machine-readable medium;

render the other model of the earth formation on a display;

determine, based on estimated parameters values for at least one parameter of interest, one or more secondary recovery operations including at least one of a drilling operation, an injection operation, and a production operation; and execute the one or more secondary recovery operations.

13. The apparatus of claim 12 wherein the second expression equates a derivative of the representation with a derivative of the function with respect to water saturation of the formation ($S_W$), and a thir expression equates a derivative of the representation with a derivative of the function with respect to porosity of the matrix of the formation ($\varphi$).

14. The apparatus of claim 12 wherein the at least one processor is configured to solve the system of equations to obtain values for Archie parameters comprises using an estimated value for the porosity of the matrix of the formation ($\varphi$).

15. The apparatus of claim 12 wherein the at least one processor is configured to solve the system of equations to obtain values for the Archie parameters comprises using the estimated values for salinity of the water of the formation, water saturation of the formation ($S_W$), to solve the system of equations.

16. The apparatus of claim 12 wherein the at least one processor is configured to display the values of the Archie parameters.

* * * * *